United States Patent
Warner

(10) Patent No.: US 10,907,260 B1
(45) Date of Patent: *Feb. 2, 2021

(54) ELECTROLYZER DEVICE

(71) Applicant: Stanley Wesley Warner, Idaho Falls, ID (US)

(72) Inventor: Stanley Wesley Warner, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,949

(22) Filed: Sep. 16, 2019

Related U.S. Application Data

(63) Continuation-in-part of application No. 15/364,450, filed on Nov. 30, 2016, now Pat. No. 10,422,045.

(51) Int. Cl.
| | |
|---|---|
| *C25B 1/04* | (2006.01) |
| *C25B 1/06* | (2006.01) |
| *C25B 15/08* | (2006.01) |
| *C25B 9/06* | (2006.01) |

(52) U.S. Cl.
CPC .............. *C25B 1/06* (2013.01); *C25B 9/063* (2013.01); *C25B 15/08* (2013.01)

(58) Field of Classification Search
CPC .. C25B 1/04; C25B 9/06; C25D 17/12; C25D 17/002; C25D 17/02; C25D 17/08
See application file for complete search history.

(56) References Cited

U.S. PATENT DOCUMENTS

| | | |
|---|---|---|
| 10,422,045 B1 | 9/2019 | Warner |
| 2004/0074781 A1 | 4/2004 | Klein |
| 2010/0089676 A1 | 4/2010 | Papachristopoulos |

OTHER PUBLICATIONS

Wu et al. "Experimental Investigation of Producing Brown's Gas using a Metal-Plate Electrolyzer for Diesel Vehicle Applications" URL: https://onlinelibrary.wiley.com/doi/pdf/10.1002/ente. 201600222, published Aug. 12, 2016.
Youtube "How Hydrogen Injection System Works in Diesel Engines" Accessed Jan. 25, 2019, URL: https://www.youtube.com/watch?v=4-55oEPU0eM.
U.S. Appl. No. 15/364,450, Nov. 1, 2017, Office Action.
U.S. Appl. No. 15/364,450, Jun. 13, 2019, Notice of Allowance.

*Primary Examiner* — Zulmariam Mendez

(57) ABSTRACT

Electrolyzer devices (e.g., for Brown's gas production, hydrogen production, other electrolysis processes) including a containment vessel configured to be filled with an electrolyte solution, with a plurality of electrically conductive plates positioned therein. Each plate may be oriented vertically, where two or more of the plates are electrode plates. The electrode plates may extend outside of the containment vessel of the electrolyzer so that electrical connections to the electrode plates can be made outside of the containment vessel of the electrolyzer. No electrical connections are made on a sealed interior of the containment vessel. Each plate may include an insular wrap around the edges of each plate. The insular wrap may include grooves formed into the insular wrap into which the plates are received. Such grooves may negate the need for any gaskets. The insular wrap may include holes for passage of the solution into and out of the cells.

19 Claims, 13 Drawing Sheets

ELECTROLYZER DEVICE

CROSS-REFERENCE TO RELATED APPLICATION

This application is a continuation-in-part under 35 U.S.C. 120 of U.S. application Ser. No. 15/364,450, filed Nov. 30, 2016, which is herein incorporated by reference in its entirety. Applicant's statements in the prosecution history of U.S. application Ser. No. 15/364,450 are also incorporated herein by reference in their entirety.

BACKGROUND

The Field of the Invention

The present invention relates to advancements in Brown's gas or hydrogen gas production using, e.g., an electrolyzer (e.g., a metallic plate alkali electrolyzer).

The Relevant Technology

Brown's gas refers to a volumetric mixture of approximately ⅔ hydrogen and ⅓ oxygen, which can be produced by an alkaline electrolyzer. The benefit of infusing Brown's gas into internal combustion engines, especially diesels, is known. Lesser known is the fact that particulate matter (PM) poisoning from diesel engines, just in California, is the cause of death for about 10 people every day. The infusion of Brown's gas into diesel engines can drastically reduce the PM that is emitted by such a diesel engine. It is also well known that present electrolyzers are too inefficient to be used for on-board production for internal combustion engines. For example, presently available electrolyzers use too much electricity to generate the needed volumes of Brown's gas that would be needed to provide a significant reduction in diesel PM and/or increase mpg. Furthermore, when considering storage of Brown's gas as a possible alternative to on-board production, Brown's gas is far too dangerous to be compressed and then later injected into the diesel engine.

In addition, electrolyzers that produce hydrogen for use by hydrogen fuel cell vehicles are extremely expensive to build. For example, the state of California is spending over $2 million per hydrogen fueling station unit, where such stations rely on hydrogen electrolyzers for hydrogen production. Finally, the current poor efficiency levels associated with such electrolyzers requires the hydrogen to be sold at a rate of about $14 to $16 per kg, which is prohibitively expensive. The inefficiency of such existing systems is a considerable obstacle to adoption of hydrogen fuel cell vehicles. The presently disclosed electrolyzer systems address one or more of such problems.

SUMMARY

In one aspect, the present improved electrolyzer comprises steel or other metallic plates wrapped by an insulating material that holds the plates in precise spacing and alignment without the use of elastomeric or other gaskets. The plates and the insulating material may be surrounded by a sealed containment vessel that is filled with electrolyte (e.g., an alkali electrolyte). The plates may be designed so that the anode and cathode plates (which are directly connected to a power supply) extend outside of the containment vessel, so that the electrical connection is made there, outside of the sealed containment vessel. For example, such anode and cathode electrode plates may be longer than any included bi-polar plates. This advantageously allows for the electrical connections to be made to such anode and cathode plates outside of the containment vessel, so there may be no direct, wired electrical connections made inside the containment vessel.

The number of steel or other electrically conductive plates used can be determined by a formula described herein, to most efficiently carry out the electrolysis process. The shape of the plates may be particularly selected to lead to more efficient electrolysis, e.g., by limiting or eliminating the presence of holes in those regions of the plates that most efficiently produce electrolysis. For example, holes in the plates in such regions would allow the electricity to pass through the holes, rather than passing through the plates, which creates the desired hydrogen. In addition, in an embodiment, an insulating material holds the plates in precise alignment relative to one another, so as to prevent electrical current from flowing around the edges of the plates, through where the insulating material is positioned. Rather, the electricity is forced to pass through the plates, creating more Brown's gas, with negligible or at least minimal electrical losses due to current flowing around the plates (along a circulation path taken by the electrolyte solution).

The shape of the plates and overall orientation of the device and its components can also be manipulated to improve the circulation of the electrolyte through the various internal cells (e.g., from the inlet, to the space between adjacent plates, eventually to the outlet, for recirculation back to the inlet). For example, circulation of the electrolyte is caused by the warmer electrolyte rising upwards in the electrolyzer and the bubbles from the Brown's gas adds to the speed, volume and efficiency of that separation or layering process. The warmer electrolyte and the Brown's gas bubbles exit the containment vessel at the top of the containment vessel. The Brown's gas is separated from the electrolyte and conveyed to the point of use (e.g., air intake of an internal combustion engine) and the electrolyte is cooled as it is outside of the containment vessel. Cooled electrolyte reenters the containment vessel at the bottom thereof, which helps to maintain a relatively cooler temperature for the electrolyte and plates, which provides more efficient production of Brown's gas, while also minimizing the presence of any water vapor in the gaseous products. Such passive recirculation can advantageously be accomplished without a pump or other active mechanical means. The efficient and inexpensive design is scalable and exceeds in efficiency all other known electrolyzer designs for on-board production of hydrogen (e.g., for use in internal combustion engines or for use in producing hydrogen for hydrogen fuel cell vehicles). While described principally in the context of an electrolyzer configured for on-board production of Brown's gas, it will be apparent that the design principles described herein could also be used in other electrolyzer devices, e.g., stationary "fixed location" electrolyzers for hydrogen production for hydrogen fuel cells, for other electrolysis systems, or the like.

State of the art metal plate alkali electrolyzers are too inefficient to provide any significant PM reduction, or significantly increased fuel efficiency, when used on board a diesel powered vehicle, e.g., while drawing power from such vehicle engine's alternator.

The design of the present improved electrolyzer is less complicated and less expensive to construct than other electrolyzers. In addition, the present design is scalable, so as to be suitable for production of small, mid-range or large amounts of Brown's gas, isolated hydrogen, or isolated oxygen. These significant advantages allow the present configurations to meet a wide variety of commercial demands for Brown's gas and hydrogen production in a commercially advantageous way.

Features from any of the disclosed embodiments may be used in combination with one another, without limitation. In addition, these and other benefits and features of the present invention will become more fully apparent from the following description and appended claims or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings. Like references refer to like elements throughout.

DETAILED DESCRIPTION

I. Definitions

Figure 1:
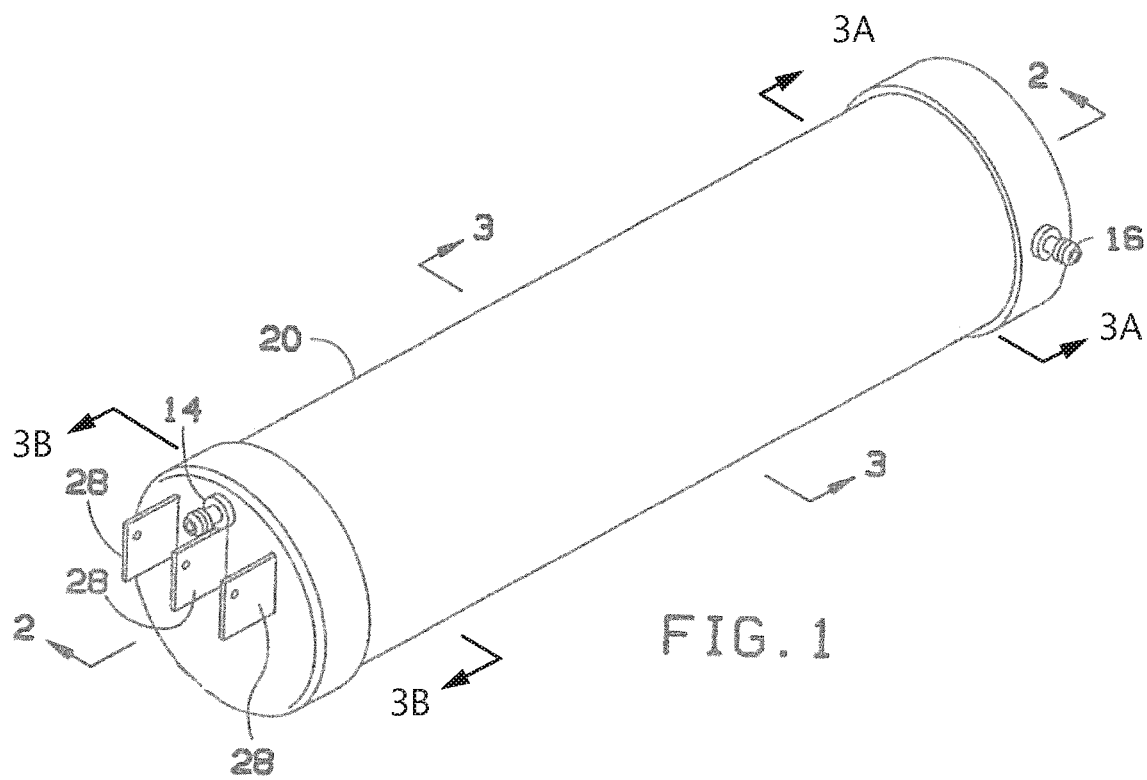
FIG. 1 is a perspective view of an embodiment of the invention.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

Unless otherwise stated, all percentages, ratios, parts, and amounts used and described herein are by weight. When referring to gaseous products (e.g., Brown's gas), the fractions, percentages, etc. may typically be on a volumetric basis.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of components, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any measured numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%. The compositions described herein may be free of any components not specifically described as included herein.

II. Introduction

Embodiments of the present invention overcome one or more obstacles to efficient electrolysis in electrolyzer devices. In an embodiment, the present invention is directed to an electrolyzer device (e.g., for Brown's gas production, hydrogen production, or other electrolysis process including a containment vessel configured to be filled with an electrolyte solution (e.g., aqueous alkali electrolyte). The device includes a plurality of electrically conductive plates (e.g., steel, other metals, etc.) within the containment vessel. In an embodiment, each plate may be oriented vertically, where two or more of the plates are electrode plates (an anode plate and a cathode plate). The electrode plates may advantageously extend outside of the containment vessel of the electrolyzer so that electrical connections to the electrode plates can be made outside of the containment vessel of the electrolyzer. In an embodiment, no electrical connections (e.g., direct, wired connections) are made on a sealed interior of the containment vessel. Each plate may include an insular wrap around the edges of each plate, so as to deny applied electrical current any stray path around the plates. In an embodiment, the insular wrap includes grooves cut or otherwise formed into the insular wrap into which the plates are received. Such grooves may negate the need for any gaskets around the plates (i.e., no gaskets may be present).

In an embodiment, that portion of each plate positioned in the containment vessel does not include any holes formed in the plates, or no holes formed in a bottom half of such plate, but if any holes are present, they are positioned in a top half of each plate. If present, such holes may be offset relative to one another, from one plate, to the adjacent plate. Some solution may also pass from cavity to cavity through gaps associated with the grooves between the insulative material groove and the received plate and/or small holes in the insular wrap between the plates (e.g., near the top and bottom of the device). By eliminating the presence of holes in the plates entirely, the efficiency of the system can be significantly increased. If some such holes are desired to increase fluid flow between the cells (e.g., to decrease operating temperature), such holes should be relatively small, and positioned in the top portion of any such plates including one or more holes therein. In an embodiment, only one such hole per plate may be present, if holes in the plates are present at all.

III. Exemplary Devices and Systems

FIG. 1 shows an exemplary electrolyzer according to the present invention. The improved electrolyzer comprises a containment vessel 20 which is shown in more detail in FIGS. 2 and 3.

Figure 2:
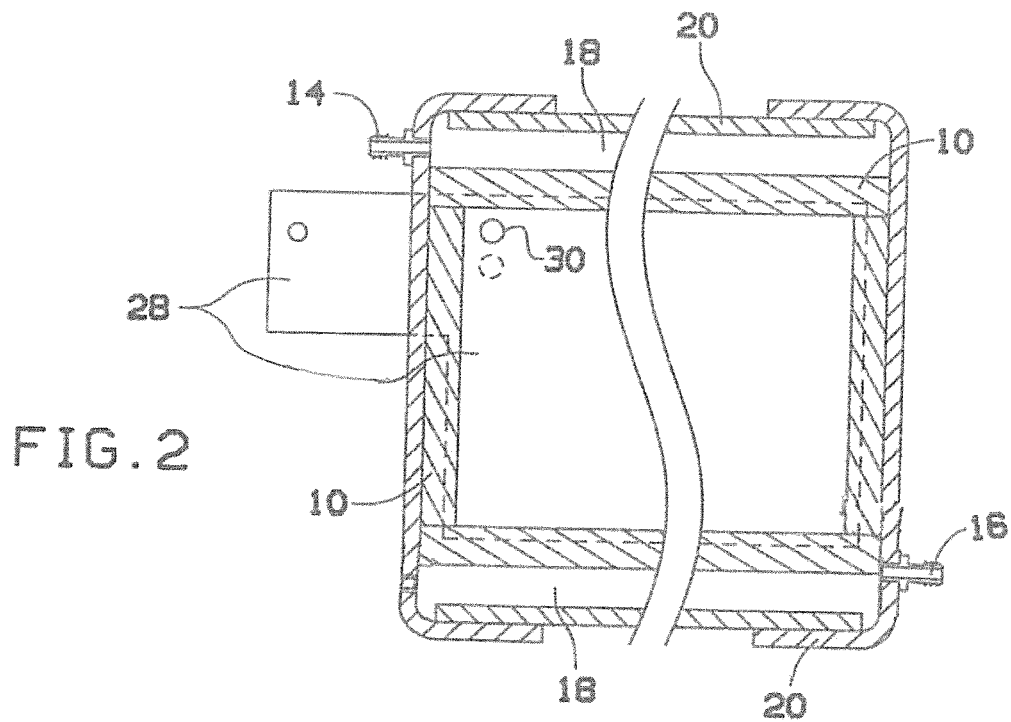
FIG. 2 is a longitudinal cross section view of the containment vessel.
Figure 3:
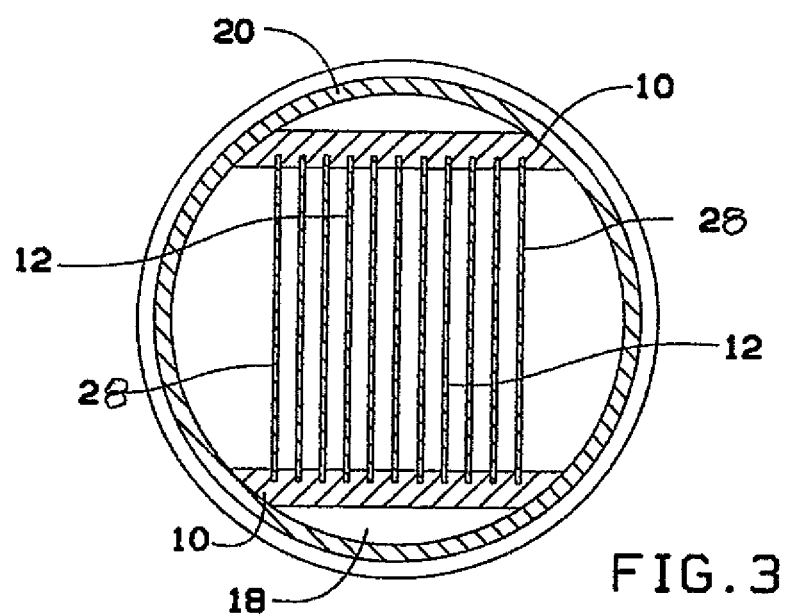
FIG. 3 is a transverse cross section view of the containment vessel.

The anode and cathode plates 28 that extend outside of the containment vessel 20 are shown in FIGS. 1-3. Interior bi-polar plates are designated 12 (FIG. 3).

Figure 3A:
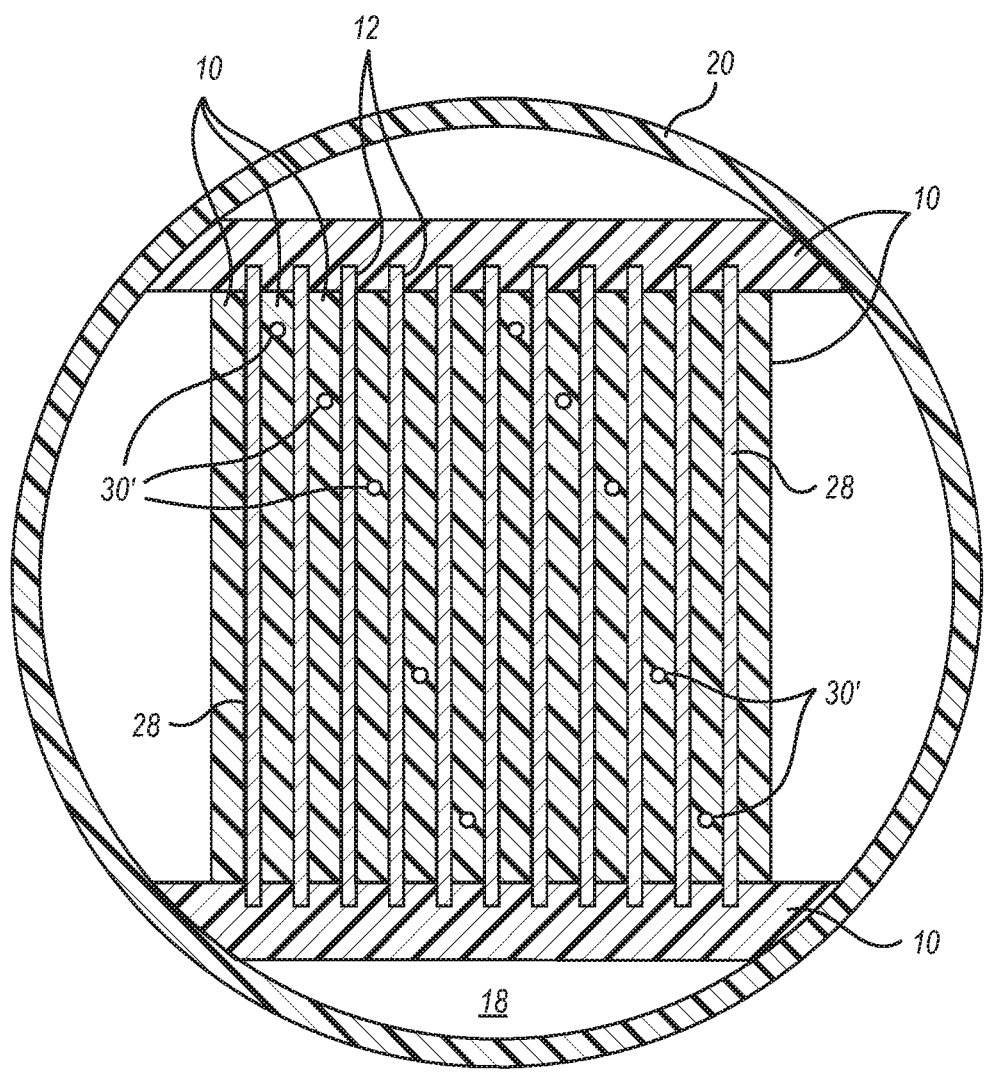
FIG. 3A is a transverse cross section view through near the bottom of the containment vessel (near the inlet) for a construction including holes through the insular wrap, rather than through the plates.
Figure 3B:
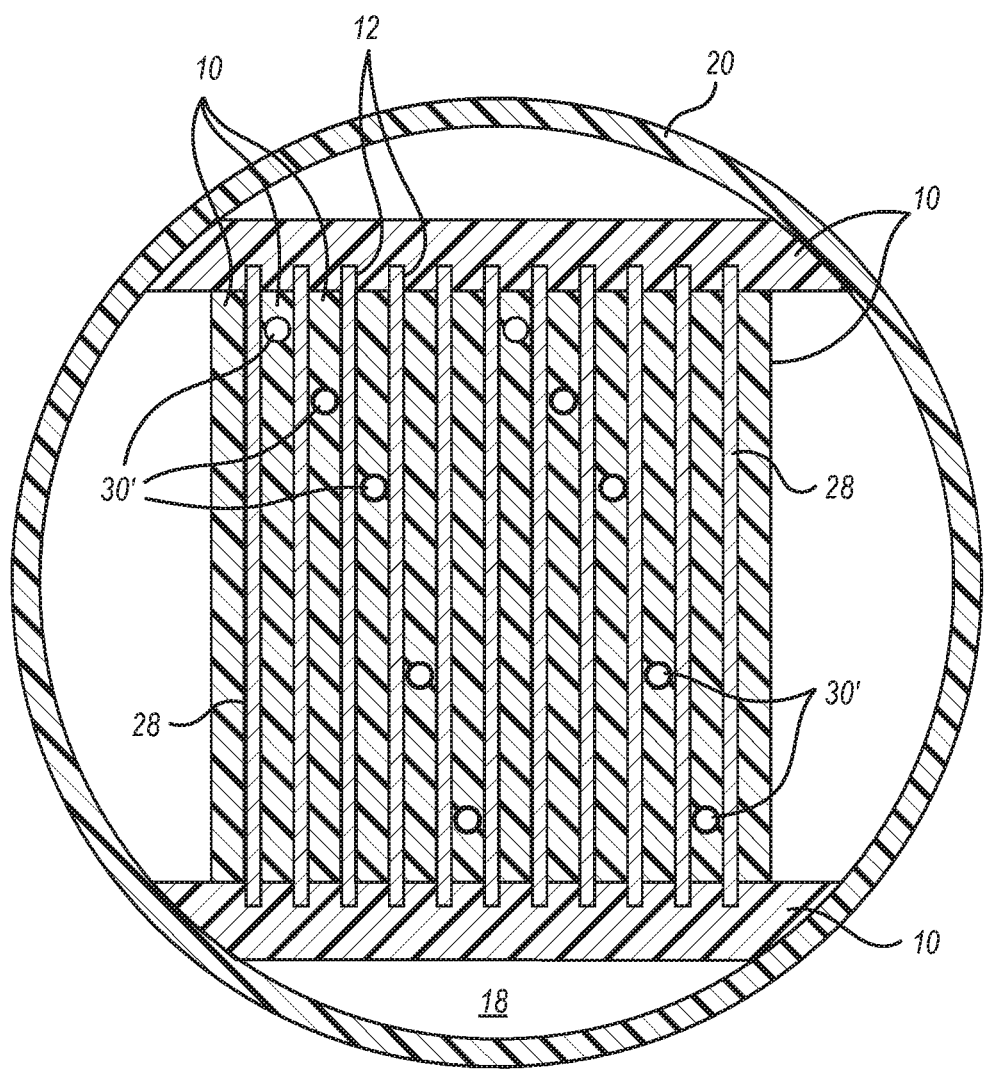
FIG. 3B is a transverse cross section view through near the top of the containment vessel (near the outlet), for a construction including holes through the insular wrap, rather than through the plates.

FIG. 1 shows the exit location 14 of Brown's gas and warmed electrolyte and the recirculation inlet 16 where the cooler electrolyte is reintroduced into the containment vessel 20. Outlet 14 and inlet 16 are also shown in FIG. 2. As shown in FIG. 2, one or both of inlet 16 or outlet 14 may open into (e.g., communicate) a storage space or cavity 18, rather than opening into a space defined between any of plates 12, 28. For example, this allows cooled electrolyte to enter the device in space 18, where it gradually works its way out of space 18 (between the interior wall of containment vessel 20 and insular wrap 10), through the insular material 10, into gaps associated with the grooves in the insular wrap, and into the electrolytic cells between adjacent plates 12, 28. Holes in the top and/or bottom of the insular wrap 10 could be provided, as shown in FIGS. 3A and 3B. In any case, as the solution warms, it gradually also rises within its given location (in the space between adjacent plates 12, 28), while Brown's gas production occurs, where the solution eventually reaches the top portion of the device, where it can exit through outlet 14.

Figure 4A:
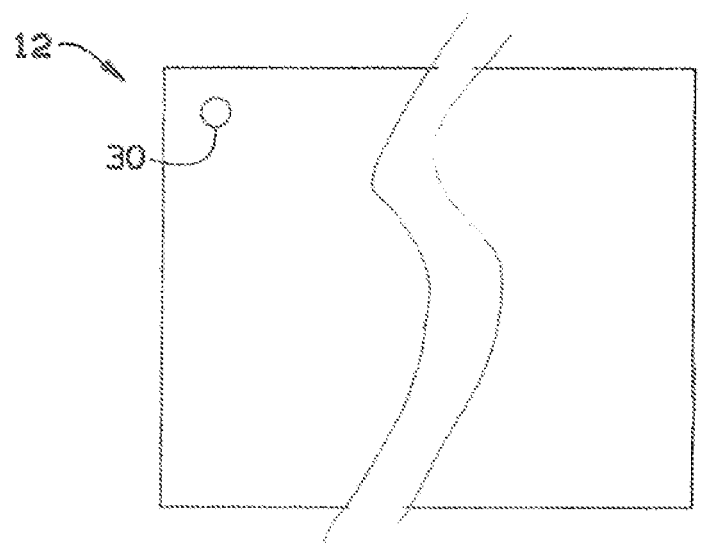
FIGS. 4A and 4B show exemplary construction of the plates.
Figure 4B:
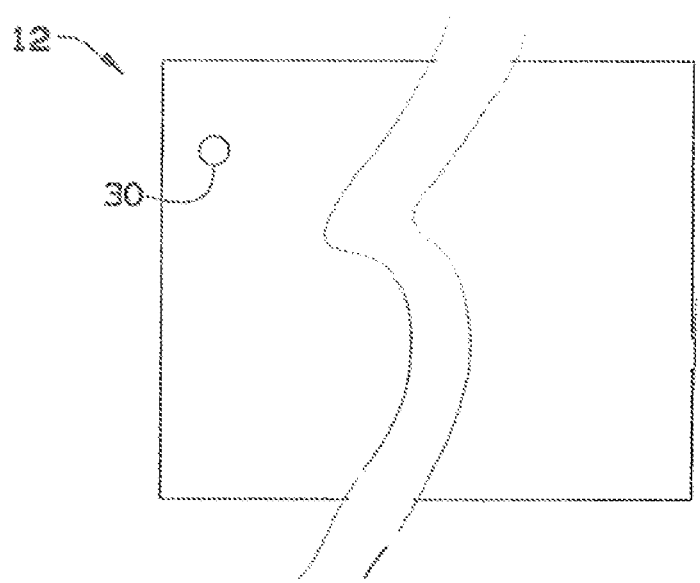
Figure 4C:
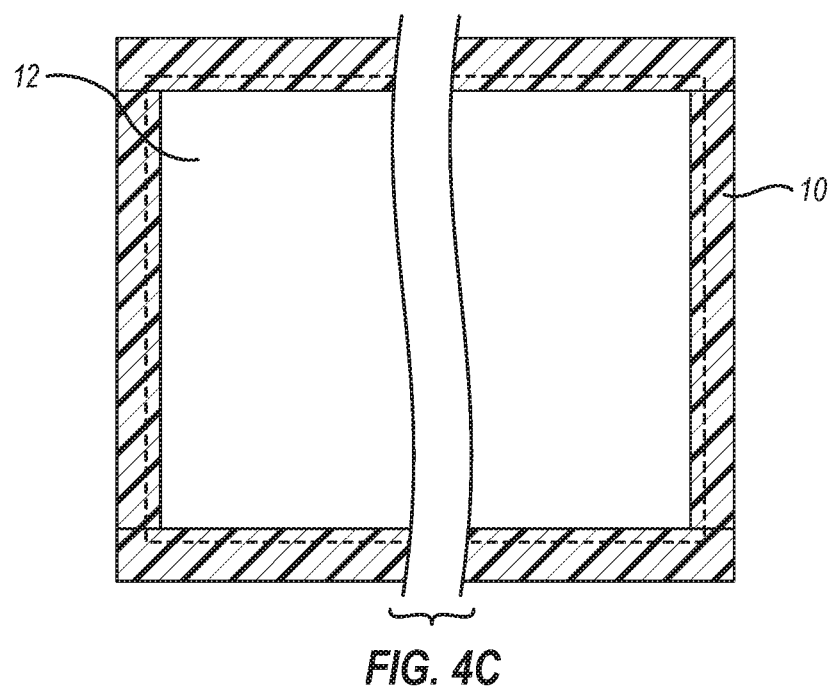
FIG. 4C shows an alternative plate construction, without holes.

While FIGS. 2 and 4A-4B illustrate a hole 30 in the top portion of plates 12, FIG. 4C illustrates another embodiment, where no such holes may be present in the plates 12. As shown in FIGS. 3A-3B, in such an embodiment, one or more small holes 30' are provided in the insular wrap 10, for electrolyte solution flow. Such embodiment with no holes in the plates may provide increased efficiency. While such solution is gradually rising, in a cell space between adjacent plates, electrolysis and production of Brown's gas is occurring. Generation of Brown's gas bubbles further aids the warmer solution to rise to the top of the device, towards outlet 14. The warmest solution and the Brown's gas product exit the cells through holes 30' (FIG. 3B) in the top of the insular wrap 10 and then out through outlet 14, where the gaseous product can be used (e.g., injected into the air intake apparatus of an internal combustion engine, captured for storage, etc.), and the electrolyte solution can be recycled back from outlet 14 to inlet 16. FIG. 3A shows how at the bottom of the device, similar holes 30' may also be provided for electrolyte flow. As shown in FIGS. 3A and 3B, the holes at the top of the device may be larger than such holes 30' at the bottom of the device. Substantial cooling of the electrolyte solution advantageously can be achieved from exit at outlet 14 to reintroduction into inlet 16. In an embodiment, additional cooling could be provided by passing such electrolyte solution through a heat exchanger between exiting outlet 14 and recycling back into inlet 16.

Because the resistance of the system is so low (e.g., less than 5 Ohms, less than 4 Ohms, less than 3 Ohms, less than 2 Ohms, less than 1 Ohm, e.g., such as about 0.5 Ohm), the heat generated from resistive heating is minor, and is insufficient to increase the temperature of the solution in the containment vessel to anywhere near steam producing temperatures. For example, the temperature of the solution may remain relatively close to the ambient temperature in which the system is installed and operated, e.g., so as to not exceed 200° F., or to not exceed 190° F., even in a hot summer climate. Depending on the ambient temperature associated with the climate of operation (e.g., hot summer temperatures or cold winter temperatures), operating temperature may typically range from 100° F. to 190° F., or 110° F. to 190° F.

FIG. 2 shows the insulating material 10 that wraps around the ends of the steel or other metallic plates 12, 28. With three electrode plates 28 as shown in FIG. 1, the center electrode may be connected as an anode, and the two outside electrode plates 28 connected as cathodes, thus applying the appropriate voltage across any bi-polar plates 12 disposed between the various electrode plates 28. In another embodiment, e.g., when used on a 24 volt system, the two outside electrode plates may be connected as a cathode and anode respectively, while the middle electrode may be left unattached to any electrical connection, acting as a bi-polar plate, which also provides for the desired voltage across the bi-polar plates. It will be apparent that various alternatives are possible, and various connection schemes will be apparent to those of skill in the art. The insulating material 10 and the interface between the groove in insulating material 10 and the inserted plate 12, 28 is typically not water-tight, so as to permit electrolyte to seep in between the plates 10 and the insulating wrap 10, replenishing electrolyte that exits the containment vessel during operation, e.g., beginning adjacent inlet 16 and ending adjacent outlet 14 in cavities 18, as described above, and shown in FIG. 2, or 3A-3B. In an embodiment, cavities 18 may extend substantially the height of the containment vessel 20, being located at a radial edge thereof (e.g., defined as a chord (see FIG. 3) extending across a circular cross section of containment vessel 20. In an embodiment, there may be a cavity space at the top and bottom of the device, adjacent the inlet 16 and outlet 14. While illustrated as cylindrical in FIG. 1, it will be appreciated the other geometries for the containment vessel and overall device are also possible. In any case, with plates seated in grooves in the insulating material 10, the amount of seepage of the electrolyte solution that may typically occur around the insulating material 10 and plates 12 may not be enough to replenish the volumetric flow rate of electrolyte that is exiting the system through outlet 14. As such, there may be small holes, e.g., in the insular wrap between adjacent plates, as shown in FIGS. 3A-3B. These holes allow small flows of electrolyte solution therethrough without allowing electricity to flow along the same path, as the path is too long and electrical resistance too high for such to occur. In an embodiment, there may be a small gap between the top of the insulative material 10 and the top of the containment vessel 20, e.g., for providing an exit flow the Brown's gas and the solution out from each cell. A similar gap may be provided at the bottom of the containment vessel, for a similar purpose (providing entrance flow from the inlet 16 into the cavity, before passing through holes 30', into the electrolysis cells.

A wide variety of suitable electrolyte materials may be suitable for use, as will be apparent to those of skill in the art. In an embodiment, various hydroxides (e.g., sodium hydroxide, potassium hydroxide), other alkali materials, or other ionic salts that are dissolvable in water to form an aqueous electrolyte solution may be used. In an embodiment, a base (e.g., any of the characteristic strong bases), providing an alkaline electrolyte is used. It will be apparent that the design concepts described herein could be employed in other types of electrolysis systems, e.g., even those that may not necessarily rely on use of an aqueous electrolyte solution. It will be apparent that the electrolyzer may therefore employ a wide variety of electrolyte solutions or other electrolyte mediums, which are within the scope of the present invention. Use of the term "electrolyte solution" and solution is used herein for simplicity, but is to be construed broadly, to include such alternatives, the selection of which will depend on the contemplated use for the electrolyzer device.

Plates 12, 28 may be formed of steel, other metallic materials, or other suitable electrically conductive material. Non-limiting examples include steel (e.g., stainless steel, carbon steel, etc.), copper, aluminum, nickel, and numerous other metals. In an embodiment, the plates may include a metallic coating (e.g., copper or nickel coated). Exemplary plates 12 are shown in FIG. 3. The plates may be generally rectangular in shape, and the electrolyzer may be operated in an upright, vertical position, with the plates oriented vertically. In an embodiment, the aspect ratio of the plates may be such that they are from about 2 to about 10 times higher than they are wide. A generally rectangular shape provides several advantages. Electrical resistance in the electrolysis process generates heat. Too much heat generation can result in unwanted steam production, as water or other volatiles in the solution volatilize. The rectangular shape allows heated electrolyte to rise inside the cell as the Brown's gas bubbles are generated, which bubbles rise rapidly due to their buoyancy in the solution. The shape allows for an extended space for the bubbles to push and carry the slowing rising heated solution to rapidly move towards the exit 14, and out of containment vessel 20. Such shape also allows for long sides (the major planar face) of the outside plates (FIG. 2) to be in contact with electrolyte in storage space 18 that is generally not being heated (as electrolysis occurs adjacent plates 12, 28, not in space 18). This allows for transfer of heat from the outside plates to the large volume of electrolyte that is stored in storage cavity 18. Thus, instead of the generated heat heating a small volume of solution, it heats a significantly larger volume of electrolyte, and solution is rapidly moved out of the containment vessel and cooled by being outside the containment vessel, before recycling into the bottom inlet 16 of vessel 20, keeping the electrolyte warm, but safely well below a temperature that would result in significant steam production. For example, during operation, temperature in the system remains substantially stable, and even after many hours of operation the temperature does not increase significantly. Generated heat is able to be removed from the system through convection cooling as the electrolyte leaves the system through outlet 14, being cooled on board the vehicle (due to convection as the vehicle drives down the road) before the solution is recycled back to inlet 16. Such passive cooling is sufficient to maintain an acceptable operating temperature. For example, such passive cooling is sufficient to maintain an acceptable operating temperature, whether in hot summer climates, or a cold winter climate, e.g., from about 110° F. to 190° F.

Where the aspect ratio is less than 2 (height of less than 2 relative to plate width), there is insufficient movement and flow rate of the electrolyte as caused by generation of the Brown's gas bubbles to create enough circulation to prevent heat build up in the cells. Thus, providing the shape and aspect ratios described herein for the plates aids in increasing efficiency of Brown's gas or other desired production. Residence time of solution in the cell may depend on operating temperature (which may depend on climate conditions where the unit is operating). For example, in cold climates, no recirculation of the solution may be needed for cooling purposes. In very cold climates of operation, it may actually be beneficial to provide an insulating wrap around the unit, in order to increase operating temperature somewhat. By way of further example, when operating in an ambient temperature below 90° F., no recirculation may be needed. Where ambient temperatures are about 100° F., the unit may still operate fine if shaded, although if not shaded, or insulated, the external recirculation may be helpful in maintaining an optimum operating temperature.

Any aspect ratio over 10 (height to width) results in limited additional advantage, associated with such increasing aspect ratio, and is thus unnecessary. The particular aspect ratio selected may be determined based on various factors such as ambient temperature where the electrolyzer is being used (e.g., summer vs. winter, or cold climates vs. hot climates). Existing electrolyzer designs are plagued with problems of thermal runaway, where the systems are not able to maintain a relatively low, steady state temperature during long term operation, while producing a volume of Brown's gas sufficient to effect significant PM reductions and/or mpg increases. Increased operating temperature is associated with increased amperage use. Such increase in current draw further increases the heat in the cell, causing overheating in a short period of time. The improved alkali electrolyzer as described herein surprisingly completely controls electrolyzer heat, even when several times the design amperage is applied. For example, in testing the unit, the unit was designed for 40 amps, and during application of 100 amps, the design surprisingly handled resulting increased heat with substantially no reduction in production efficiency, and no temperature overload (e.g., substantially no steam production). Such testing also included application of 100 amps to only one bank of a two bank system to see the effect of a "test to destruction" type test. Even more surprising was the fact that this did not overload the cooling capacity of the system.

In an embodiment, all plates may be of the same size and shape, other than of course the anode and cathode plates 28, which extend outside (e.g., above) containment vessel 20. Such a configuration provides for increased safety and ease of inspection and maintenance. In the prior art, often electrical connections or even electrical wiring to the plates may not be well secured, which can create a safety hazard because any electrical spark inside the cell can ignite the Brown's gas, causing an explosion. Such is not the case with the present design, where all electrical connections are made outside of the containment vessel 20, where no Brown's gas is present.

In an embodiment, the plates may not include holes along a bottom portion of the plates, as is the case in many other designs, particularly those employing sealing gaskets. Holes in the bottom or middle portions of the plates are typically used to allow inflow of electrolyte into the cells to replenish that which is used. The problem with such designs is that electricity follows the path of least resistance. That path of least resistance is not through the plates so as to generate Brown's gas, but through such holes, or even around the edges of the plates in some designs. The use of holes in the bottom portion of plates as used in existing configurations results in Brown's gas production only on some of the plates, losing out on production that could occur on plates that have holes in them, as well as for a significant distance of "dead space" surrounding the holes, based on the resistance of the solution minus the resistance of the plates. Existing implementation of designs using holes causes a significant loss in efficiency as compared to the present configuration, where no holes are typically provided along the bottom portion of the plate, or even the middle portion of the plate. In existing designs, even offsetting of such holes does not significantly improve efficiency. For example, where holes are offset from one plate to the next, the electricity simply passes from one plate through a hole, to another plate. The voltage difference between the two plates on each side of a given plate with a hole is about twice the optimum designed voltage for the electrolyzer, causing decreased efficiency and lower Brown's gas production. Added to this is the loss of production in the plate that has the offset hole in it (as holes decrease available production surface area). The present configuration may have no holes in the plates, or employ offset holes, but ensures that any included hole(s) are in the top portions of the plates only. Holes provided in the insulating wrap may of course also be offset, from one cell to the next. During operation, the top of the plates are filled with Brown's gas bubbles escaping the containment vessel along with the warmer electrolyte. For example, an embodiment of the present configuration, sized for use with a typical diesel engine for a tractor-trailer, can easily generate 3-5 L/m of Brown's gas for injection into the air-intake apparatus of the engine. Such is sufficient to achieve significant reductions in PM emissions, as well as significant mpg increases Placement at the top portion of the plate (or in the insulating wrap, or as a gap between the wrap and the top of the containment vessel) advantageously significantly reduces losses in efficiency that otherwise occur with existing designs. For example, a fuel injection type engine using the systems described herein may see an increase in mpg of at least 10%, such as 20-30%. Reductions in PM emissions may be greater than 50%, greater than 60%, greater than 70%, or even greater than 80%. Such increases in mpg and decreases in PM emissions are significant.

In an embodiment, the spacing between the plates may be equal, from plate to plate, including the anode plate 28, any bi-polar plates 12 and the cathode plate 28. For example, in an embodiment, such spacing may be from about ⅛ to about ⅝ inch. Such spacing may refer to the gap between plates (i.e., from surface to adjacent surface). Actual plate spacing may depend on various factors, such as size of plates, thickness of plates, composition of plates, electrolyte and concentration used, etc. Proper plate spacing can improve Brown's gas production and reduce heating.

The number of plates used may depend on the applied voltage, which voltage may vary widely. In existing electrolyzer designs, typically a voltage must be transformed to a suitable voltage that the electrolyzer is compatible with. The present configurations have no such requirement, allowing a variety of voltages to be used with no need for a transformer. In an embodiment, a particular formula can be used to determine the minimum and maximum number of plates to be used in the present electrolytic devices. Such formula may simply be that the minimum number of plates is calculated as the voltage used divided by 3. This gives the minimum number of plates to be used, which number is inclusive of all plates (anode plate, cathode plate, and any bi-polar plates). The formula for determining the maximum number of plates may simply be the voltage divided by 1.5. This number is also inclusive of all plates. Final determination of the actual number of plates to be used within that range of the minimum and maximum number may depend on various factors, such as electrical frequency (Hz), electrical voltage and amperage stability, plate spacing, plate composition, electrolyte type, electrolyte concentration, and the like. Following such a determination process can significantly affect efficiency, and Brown's gas production level. For example, number of plates may equal the voltage to be used, divided by 2.5, minus 1. Where voltage is 12-18 volts, the number of plates may typically be 3 to 7 (e.g., 5). A 24 volt system may include more plates (e.g., 8-10). By using electrolyzer configurations as described herein, and using such a process for determining the number of plates, the achieved efficiency and Brown's gas production level can be significantly improved as compared to what is available from the state of the art.

Use of insulating material 10 is superior to gaskets as it only takes a small fraction of an inch groove (e.g., ⅛ inch) to be cut to hold the desired precise alignment of the plates 12. Where gaskets are used, much more of the surface area of each plate is covered by such gasket (e.g., ⅜ to ½ inch, typically) in order to hold the plate in place, thus losing valuable production surface area of the plates. In addition, over time, gaskets (e.g., rubber or other flexible, elastomeric gaskets) will crack, tear, or otherwise decompose, resulting in leakage of the highly concentrated alkali electrolyte solution, necessitating replacement. Such is problematic if the containment vessel may be sealed, without the ability to access internal components, as contemplated herein. Furthermore, to keep gaskets and the end plates from warping, the gaskets must be compressed in their center, which greatly adds to the width of the gasket as it must have a series of holes in it to allow for insertion of bolts. This is problematic in that the bolts must also pass through the plates that are electrified. From the above, it is clear that prior art configurations that use gaskets have serious design and efficiency obstacles. In at least some embodiments, the present invention may advantageously not rely on the use of gaskets to seal or insulate around plates 12.

Both FIGS. 2 and 3 show how the insulating material 10 may be tightly fit into the containment vessel 20. For example, insulating material 10 may be slid into the containment vessel 20 during assembly. Because of the tight fit, the insulating material 10 and the plates 12 cannot move to any significant degree or lose their desired precise alignment even given the vibrations of onboard installation on motorized vehicles, as contemplated. While an adhesive or a mechanical stop or retainer structure could be used to hold the insulating material 10 in place within containment vessel 20, in an embodiment, a friction fit may be sufficient to hold these components in place. For example, the insulating material 10 can be tightly fitted to the plates 12, 28, and the containment vessel 20. After assembly, the assembly of insulating material 10 and plates 12, 28 can be slid into the containment vessel 20. The tight fit into an extremely strong schedule 40 PVC containment vessel does not allow vibration associated with an on-board electrolyzer to allow dislodgement of the plates from their desired precise spacing. The particular design resists damage due to vibration, or even dropping, and is incredibly robust, while other electrolyzers are negatively affected by typical vehicle on-board conditions. Furthermore, this can be accomplished without bolts, nuts, washers, or other fasteners that may introduce additional metallic components around the electrified plates, that may become dislodged, causing damage or loss to the electrolyzer device. The insulating material 10 may comprise any suitable alkali resistant insulative material, examples of which include various polymers, including, but not limited to PVC, HDPE or the like.

FIGS. 2 and 3 show an extra space or cavity 18 in the containment vessel 20, between insulating material 10 and the interior wall of vessel 20 that may hold extra electrolyte, which can help to absorb some of the heat generated by operation of the electrolyzer. Such a space 18 may also allow such extra electrolyte to seep around insulating material 10 and plates 12, entering into the cells adjacent the plates 12 where electrolysis occurs, replenishing warmer electrolyte exiting the top of the device through outlet 14. The warmed electrolyte exiting through outlet 14 with the generated Brown's gas is cooled outside of the containment vessel 20 and reintroduced into the containment vessel 20 at the inlet fitting 16, e.g., located as shown at or near the bottom of the device. No active cooling of recirculated electrolyte is typically needed (e.g., pumping or otherwise conveying through a heat exchanger or the like), although such could be employed, if desired. The passive recirculation and passive cooling process for the electrolyte can advantageously be accomplished without the need for a pump or other active pumping mechanism, further making the present electrolyzer simpler and more efficient than state of the art configurations.

While FIG. 1 shows anode and cathode plates 28 extending outside the containment vessel 20, FIG. 3 shows how there may be additional bi-polar plates (non-anode plates and non-cathode plates) 12, to which no direct electrical connections are made. Such bi-polar plates differ from the anode and cathode plates 28, which include direct electrical connections, e.g., at the portion of such plates that are exterior to containment vessel 20, as shown in FIG. 1. For example, such connections may be made by "sure" compression or welded connections. The number of included bi-polar plates may be determined by the voltage used and the formulas described herein. As shown in FIG. 3, in an embodiment, the anode and cathode plates 28 may be at the ends of the series of parallel plates (28 and 12), with one or more bi-polar plates 12 disposed between such plates 28.

FIGS. 4A and 4B show bi-polar plates 12 that may include offset perforations or other holes 30. FIG. 4C and FIGS. 3A-3B illustrate another embodiment in which the plates do not include any holes, but where holes 30' are provided in the top portion of the insulating wrap 10 between the plates, but not in the plates 12. In an embodiment, if such holes (e.g., 30) are used in the plates, they may be positioned only at the top portion of each plate. For example, in an embodiment, any offset associated with holes 30 or 30' may be at least equal to the diameter or width of the hole, from one adjacent hole to the next. Such offset may be at least equal to 1.5 times the hole diameter or width, or at least equal to 2 times the hole diameter or width. FIG. 2 illustrates an offset between adjacent plate holes 30 of about 1.5 times the hole diameter (i.e., the distance from the axial center of one hole to the axial center of the next hole as shown in FIG. 2 is about 1.5 times the hole diameter). Placement of the holes may advantageously be in the top half of the plate, as described herein. More advantageously, placement of the hole may be within the top 40%, top 30%, top 25%, top 20%, or top 10% of the plate, as represented in FIG. 2. FIGS. 3A-3B show offsetting of the holes in the insular wrap from one hole to the next, which holes provide access into adjacent cells, and which holes are offset sufficiently to ensure no stray voltage or amperage passes therethrough, rather than running through the plates (which is desired to produce Brown's gas).

While holes are shown in FIGS. 2, 4A and 4B, in an embodiment (e.g., see FIG. 4C), no such holes may be present in any of the plates, or at least some of the plates may be provided without such holes. For example, as shown in FIGS. 3A-3B, holes 30' may be provided in the insulating material 10 between the plates 12, a gap may be provided between the top of the insulating material 10 and the interior wall of the containment vessel 20, so that the electrolyte solution and Brown's gas are able to exit through holes in the insulating material 10 between the plates. Where provided, any holes may be of a threshold minimum size, or not larger than a maximum size. For example, where one or more holes (holes 30 or 30') are provided, each hole may be sized to be 0.5 in$^2$ or smaller. By way of example, a circular hole 1 inch in diameter has an area of 0.785 in$^2$, while a circular hole 0.75 inch in diameter has an area of 0.442 in$^2$, a circular hole 0.5 inch in diameter has an area of 0.196 in$^2$, a circular hole 0.25 inch in diameter has an area of 0.0491 in$^2$, and a circular hole 0.125 inch in diameter has an area of 0.0123 in$^2$. Such very small holes may reduce losses due to electrical "short circuiting" associated with current flow through the holes, rather than through the plates themselves. As also noted herein, relatively few (if any) such holes may be provided in a given plate (e.g., as little as one hole per plate, or one hole in the top portion of the insulating material), where such holes are positioned only in the upper half of the plate (or the top portion of the insulating material), so as to be away from the lower portions of the plate, where Brown's gas production may predominantly occur.

In a similar manner, the total surface area associated with such holes may be limited (e.g., no more than 1 in$^2$ per plate, or no more than 5%, no more than 4%, no more than 3%, no more than 2%, or no more than 1% of the surface area of a given plate, etc.). For example, any such holes may be positioned near the top of the plate, where the Brown's gas generated may also accumulate, so as to position the holes where they may have the least effect on Brown's gas production, while at the same time permitting sufficient fluid flow through the device, from space 18, into the various electrolytic cells of the device, and out the outlet 14. Such values may similarly apply to where holes 30' may be provided in the insulating material, for fluid flow. Minimizing the size of such holes allows the solution and generated Brown's gas to flow into and out of the cells without allowing the electricity to jump past any bi-polar plates. The size of such holes, e.g., in the insulating material or elsewhere is important only in so much as the resistance values are such that the distance between open paths between plates have more resistance in the fluid than the resistance to pass through the bi-polar plates, thus allowing no stray amperage. Substantially all electricity is being used to create Brown's gas. As such, the size of the holes (e.g., hole sizes may be smaller at the bottom and relatively larger at the top) are not so important, just so long as the resistance characteristics noted above are met—so as to allow no significant stray amperage.

In an embodiment, the electrolyzer device may operate at an efficiency of at least 40%, at least 50%, or even at least 60%. Such efficiency may be based on the heating value of produced H$_2$, as described below in the experimental testing section.

The electrolyzer may advantageously operate at relatively low pressure (e.g., atmospheric pressure). In another embodiment, the electrolyzer may be operated under pressurized conditions. For example, under high pressure conditions, the operating pressure may be at least 5 atm, at least 10 atm, at least 20 atm, at least 30 atm, at least 40 atm, up to 500 atm, up to 400 atm, up to 300 atm, up to 200 atm, such as 40 to 200 atm, or the like. Such pressurized conditions may for example increase the efficiency of the electrolysis process. Embodiments operating at low pressure (e.g., at or near atmospheric pressure) may advantageously provide safety benefits, as well as simplicity, as compared to high pressure operation. High pressure systems may allow operation at higher temperatures while minimizing volatilization of the solvent, at which temperatures hydrolysis or other electrolytic processes may be more favorable.

In an embodiment, the device may incorporate one or more magnets to further improve the efficiency of the electrolysis process. For example, any type magnet (e.g., permanent magnet, rare earth magnet, AlNiCo magnet, electromagnet, or other may be positioned near, on, or within the device to increase electrolysis efficiency. For example, such magnets may be positioned on either end of the unit, which may provide a small by significant increase in efficiency (e.g., up to 5% better efficiency).

In an embodiment, the system or method may employ resonance, e.g., to increase efficiency. For example, in an embodiment, resonance may be induced by use of a pulsed electric current, application of sound waves, or the like, to induce resonance into the process. In an embodiment, the frequency of such pulsed electrical current, sound waves, or the like, may be of a low frequency, e.g., from about 1 Hz to about 500 Hz, or from about 25 Hz to about 200 Hz. In another embodiment, the frequency may be high frequency, such as 12 kHz to 20 kHz, or from 14 kHz to 18 kHz. The selected resonance frequency may be matched to the natural resonance frequency of the metal material from which the plate is formed.

Another embodiment may include introduction of light or other electromagnetic radiation (e.g., visible wavelengths, infrared, ultraviolet, or other wavelengths) into the electrolysis process. Any of such additions may increase efficiency by a small but significant degree (e.g., up to 5%). Any of such additions may serve to slightly reduce the covalent bonding energy across the O—H bond in a water molecule, aiding in electrolytic production of O$_2$ and H$_2$.

While described principally in the context of an electrolyzer for Brown's gas production, it will be appreciated that the concepts described herein may be employed in other electrolyzer fields, such as, but not limited to H$_2$ fuel production for hydrogen fuel cells, H$_2$ production for biodiesel production, any of a variety of acidic or alkaline electrolytic systems, precious metal electrolyzers (PEM), and the like.

The present application describes an improved alkali electrolyzer that is well suited for onboard production of Brown's gas that can provide significant reductions in PM emissions from diesel engines, while at the same time significantly increasing fuel efficiency. The applicant's electrolyzer design was tested at U.C. Davis, Center for Transportation Studies, Andrew Burke, Ph. D. and Marshall Miller, Ph. D., as described below.

IV. Testing and Results a. Introduction and Summary

An experimental test setup for verifying the performance of an electrolyzer provided by applicant was established in the Battery Laboratory at the University of California-Davis. The electrolyzer was of the flat plate type using 316L stainless steel plates and a water-sodium hydroxide solution as the electrolyte. A series of tests was run operating the electrolyzer at currents up to 100 A in both constant current and pulsed current modes. Analysis of the data indicated that the electrolyzer functioned reliably and in a predictable manner at all tested currents. The Brown's gas production rate was found to be generally linear with current and in agreement with Faraday's Law. The Warner electrolyzer met the developer's claim of 3-4 L/min of Brown's gas production at 60 A.

The calculated energy efficiency of the electrolyzer based on the high heating value of hydrogen was 61% at 70 A. The performance and pulse characteristics of the Warner electrolyzer indicated it was well suited for use in diesel engine applications.

b. Brown's Gas in Engines and Water Electrolysis Production

Infusion of Brown's gas into a diesel internal combustion engine creates faster, more efficient diesel burn. That burn will create more power/better mileage and fewer pollutants. The infusion of hydrogen alone does not produce the same benefits. Both hydrogen and oxygen are needed to produce the beneficial effects. Brown's gas may also contain radicals of hydrogen and oxygen. For years, the problem has been how to get Brown's gas for injection into the diesel engine. Compressing Brown's gas, as an option, is at lease problematic and surely dangerous. The preferred option is the on-board production of the gas, as needed and then infusing it directly into the engine air intake system. Development of an onboard electrolyzer connected to the vehicle alternator system is a convenient solution for vehicle applications.

Alkaline water electrolysis is an attractive method for hydrogen production, offering the advantage of simplicity. The decomposition of water into hydrogen and oxygen can be achieved by passing an electric current (e.g., DC) between two electrodes separated by an aqueous electrolyte with good ionic conductivity. The total reaction for splitting water is $$H_2O(l) + \text{electrical energy} \rightarrow H_2(g) + \tfrac{1}{2}O_2(g) \quad (1)$$

In an alkaline electrolyzer the electrolyte is usually KOH or NaOH, where the positive ions $K^+$ or $Na^+$ and hydroxide ion $OH^-$ facilitate flow of current between the electrodes. The anodic and cathodic reactions at the electrodes are:

$$\text{Anode: } 2OH^-(aq) \rightarrow \tfrac{1}{2}O_2(g) + H_2O(l) + 2e^- \quad (2a)$$

$$\text{Cathode: } 2H_2O(l) + 2e^- \rightarrow H_2(g) + 2OH^-(aq) \quad (2b)$$

$$\text{Overall: } H_2O(l) \rightarrow H_2(g) + \tfrac{1}{2}O_2(g) \quad (3)$$

From Eq. (3), Brown's gas consists of ⅔ hydrogen and ⅓ oxygen by volume. The production rate of Brown's gas can be calculated using Faraday's law and the ideal gas relation as follows:

$$I/\text{cell} = nFm_{H2}/\text{cell}, \ n=2, \ m_{BRG}/\text{cell} = 1.5\ m_{H2}/\text{cell} \quad (4)$$

Where I/cell is the current (A) through the cell, F is Faraday's constant ($0.965 \times 10^5$), n is the number of electrons per mole of $H_2$, $M_{H2}$ is the rate of hydrogen production (moles $H_2$/sec). It follows from Eq. (4) that $$m_{H2}/\text{cell (moles/sec)} = 0.518 \times 10^5\ I/\text{cell} \quad (5)$$

Using the ideal gas law, the volume production of hydrogen is given by $V_{H2}$ (m³/sec)=(RT/p)$m_{H2}$, where R is the gas constant equal to 8.314. At ambient temperature and pressure, $$V_{H2}\ (m^3/\text{sec}) = 2.375 \times 10^{-2}\ m_{H2},\ V_{H2}\ (L/\text{min}) = 1.425 \times 10^3 m_{H2} \quad (6)$$

Substituting from Eq. (5) for $m_{H2}$/cell, $$V_{H2}\ (L/\text{min})/\text{cell} = 0.738 \times 10^{-2}\ I/\text{cell} \quad (7)$$

The Brown's gas production is 1.5 times the hydrogen production. Hence the volumetric rate of Brown's gas production for a particular electrolyzer is given by $$V_{BG}\ (L/\text{min})/\text{electrolyzer} = 1.11 \times 10^{-2} \times N_c\ I/\text{cell} \quad (8)$$

where $N_c$ is the number of cells in the electrolyzer.

The calculation of the cell voltage is not simple. It involves determination of the open circuit voltage and the cell resistance in the electrolyzer. The open circuit voltage can be determined from thermodynamics. The reversible cell voltage $V_{0,rev}$ is given from Gibbs Free Energy ($\Delta G$) for the overall reaction and the thermoneutral voltage $V_{0,thn}$ from the total energy change $\Delta H$, where $V_{0,rev} = V_{0,rev}/nF$, $V_{0,thn} = V_{0,thn}/nF$ For room temperature and pressure, $V_{0,rev} = 1.23V$, $V_{0,thn} = 1.48V$.

For the electrolyzer, the appropriate open circuit voltage is $V_{0,thn} = 1.48V$. If it is assumed that the cell resistance R is a constant, the cell voltage can be expressed as $$V_{cell} = 1.48 + I_{cell}R \quad (9)$$

The efficiency η of an electrolyzer can be expresses as the ratio of the heating value of the hydrogen produced to the electricity needed to produce that hydrogen from the electrolyzer. Hence the efficiency can be written as $$\eta = m_{H2}(\text{moles/sec}) \times (J/\text{mol})_{HHV}/VI \quad (10)$$

where $(J/\text{mol})_{HHV} = 284 \times 10^3\ J/\text{mol}_{H2}$ c. Experimental Setup and Testing The experimental setup for testing the present electrolyzer included the electrolyzer, a Bitrode battery tester, a gas flow meter and a data acquisition device. The electrolyzer was tested much like a battery in that the current was specified, controlled by the Bitrode, and the response of the test device was measured. In the case of the electrolyzer, this meant that the voltage and Brown's gas produced were the measured quantities. The electrolyzer was tested in a configuration including two banks—designated left and right banks. The banks can be tested separately or in parallel. Each bank included 5 cells connected in series for each bank. Hence there were 10 cells in the overall system and the current per cell is the total current divided by two. The operating voltage of the unit is in the range 10-15 V similar to the lead-acid battery in a truck that the system may be connected to (e.g., with voltage supplied by the alternator). The technical specifications of the tested electrolyzer are given in Table 1 below. The 2 bank system included 1+ plate, 4 bi-polar plates, 1− plate, 4 bi-polar plates, and 1+ plate.

For example, if one wanted to use one bank of a 12V system, one could electrically connect to only the 1+ plate and the 1− plate. 6 plates were being used in the tested system, with the $2^{nd}$ bank sharing the 1− plate. If a vehicle is a 24V system, one could electrically connect the + lead to the 1+ at one end and the lead to the other 1+ plate at the other end of the line of plates.

TABLE 1

| Electrodes | Metal plates, constructed of 316 L stainless steel |
|---|---|
| Plate Dimensions | 4 in × 17.5 in (active area of 452 cm²/plate) |

Measurement of the Brown's gas produced is not straightforward, because the composition of the gas is not known for certain and neither is its temperature and pressure known accurately. Hence it was desired to measure directly the volume of gas produced. This was done using a Gilian Gilibrator 2 Calibration System (Sensidyne) on loan from the Hydrogen Lab at UC Davis. This device measures the rate of gas produced by tracking the motion of a soap film bubble between two known points in a cell. Repeated measurements are made at 10 second intervals and then averaged. The result yields the volumetric rate directly, independent of gas composition and temperature and pressure conditions.

When used to enhance the performance and fuel economy of a diesel internal combustion engine, the amount of Brown's gas may be varied depending on engine load and RPM. Hence it is of interest to know the limits of the Brown's gas production and the associated voltage and the pulse characteristics of the electrolyzer. To meet these requirements, the electrolyzer was tested as follows:

(1) The Brown's gas produced (L/min) and voltage were measured as a function of input current. The stability of operation at each test condition was noted.

(2) The dynamic performance of producing Brown's gas in a pulse current testing mode was measured for various pulse/current conditions.

(3) Detailed data analysis was performed to determine how well the electrolyzer performance could be described in terms of well-established laws of gas chemistry and electrochemistry, such as the ideal gas law and Faraday's law.

A series of tests was conducted to investigate the performance of the tested electrolyzer operated in constant current and variable current modes. The response voltage was monitored per 100 ms and the flow rate of Brown's gas was measured over 10 sec intervals and then averaged.

Constant Current Testing

Figure 5:
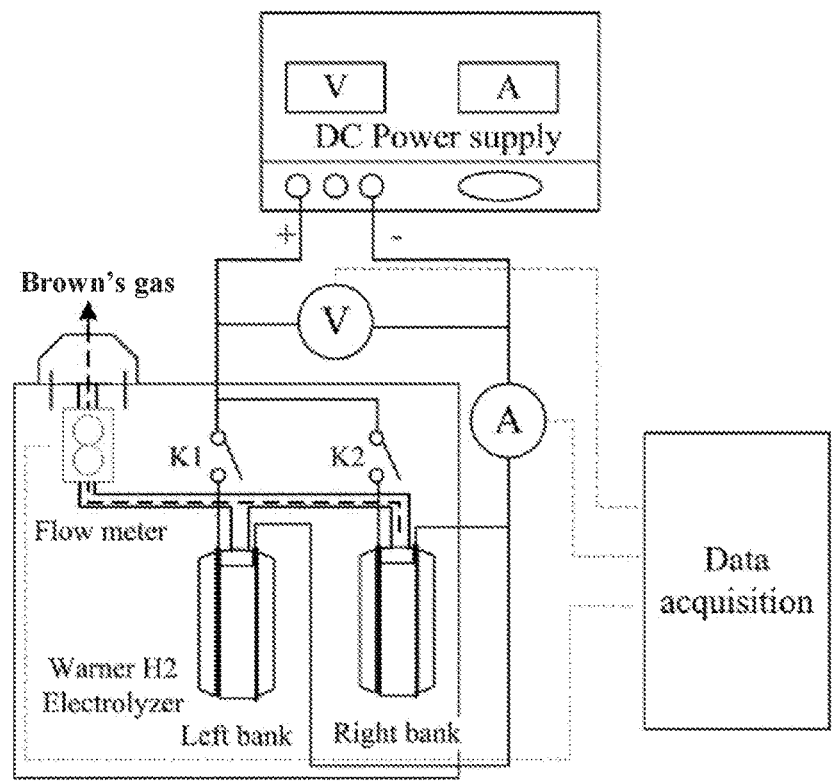
FIG. 5 schematically illustrates the set up used in testing an exemplary electrolyzer system.
Figure 6A:
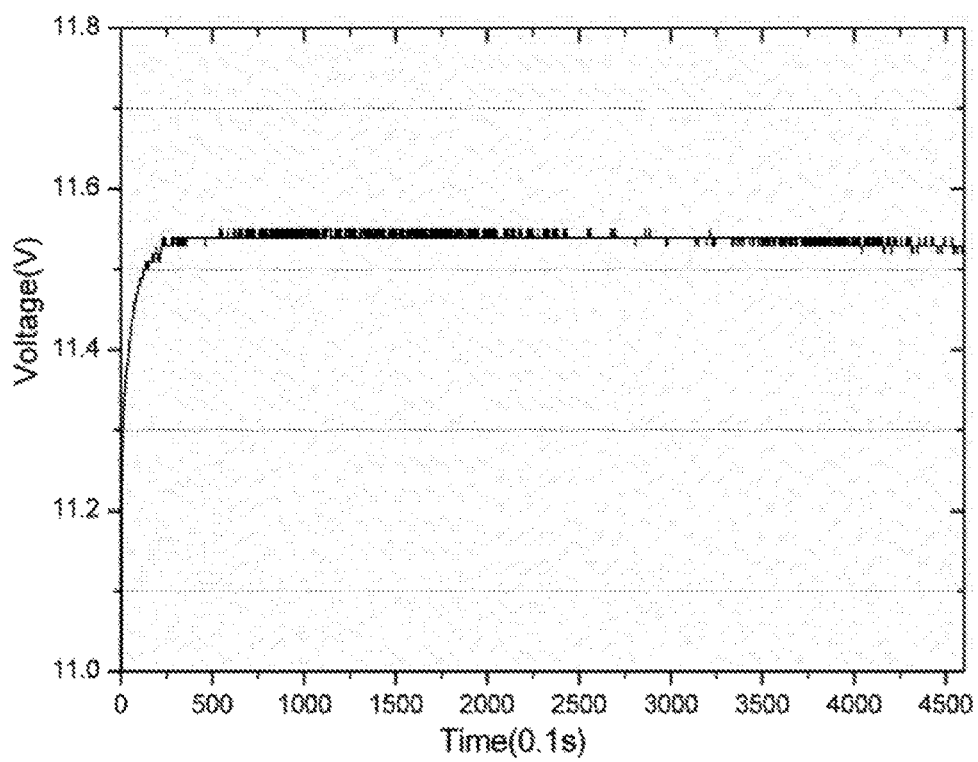
FIG. 6A charts voltage response with an applied 40 A constant current.
Figure 6B:
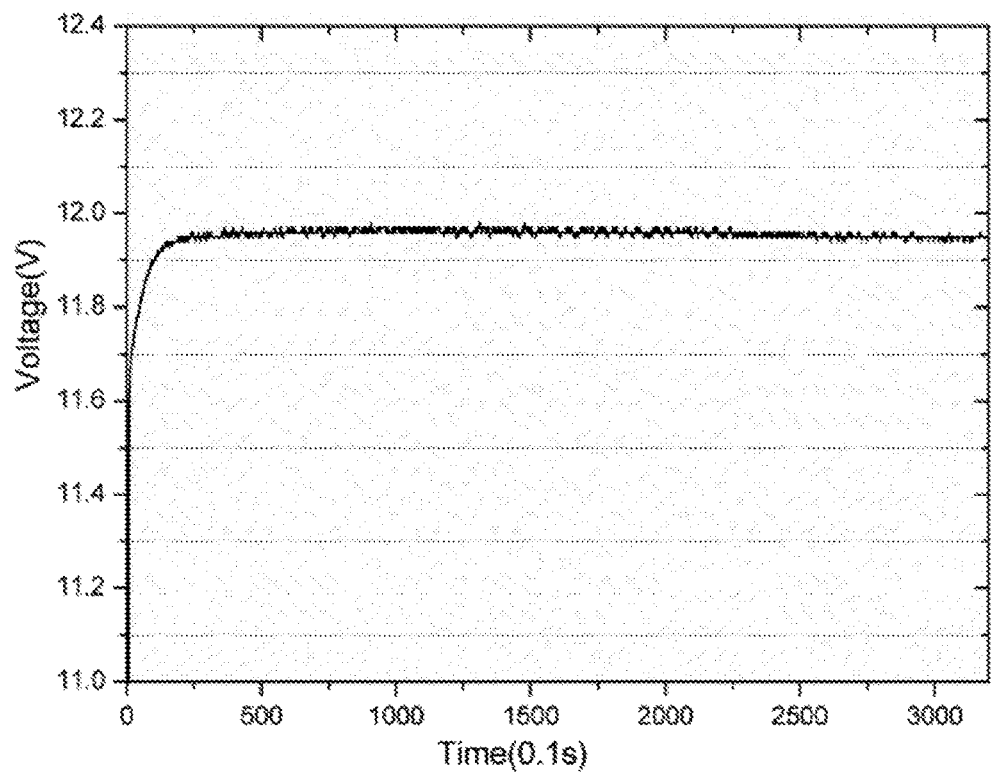
FIG. 6B charts voltage response with an applied 50 A constant current.
Figure 6C:
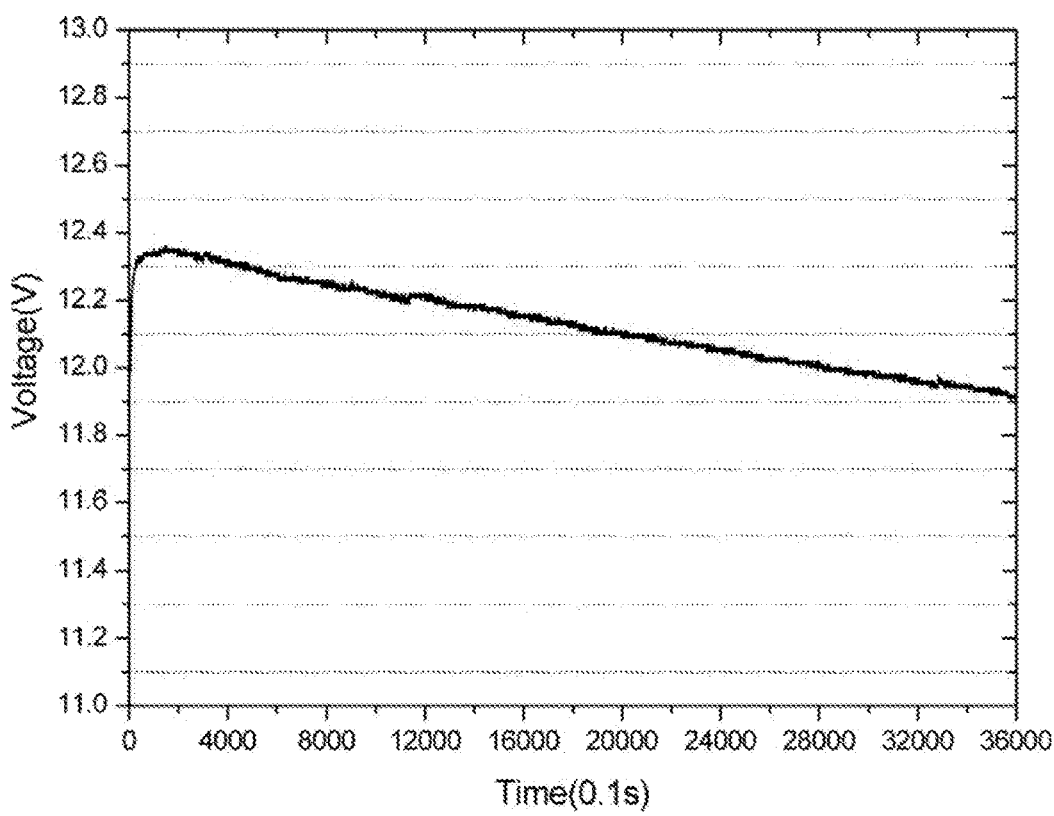
FIG. 6C charts voltage response with an applied 60 A constant current.

When switches K1 and K2 are closed (FIG. 5), the left bank and the right bank are in parallel and the current is split (e.g., equally) between the two banks. FIGS. 6A, 6B and 6C show the voltage response curves when the electrolyzer is fed with a constant current of 40 A, 50 A and 60 A, respectively. As seen in FIGS. 6A and 6B, when the current is 40 A and 50 A, the response voltage curve looks substantially flat for 10 minutes. However, when the test time is extended to 1 hour as in FIG. 6C for a current of 60 A, a slope of the voltage curve is apparent and it is clear the voltage decreases slowly with time. However, a careful study of FIGS. 6A and 6B indicates the slope of the voltage curves for 30 A and 40 A are consistent with the longer test shown in FIG. 6C. It is expected that the temperature of the electrolyzer will slowly increase with time due to resistance I2R heating. This increase in temperature is the likely reason for the slow decrease in the voltage seen in FIG. 6V. Unfortunately, it was not possible to sample the internal temperature of the tested electrolyzer due to its closed structure.

Pulsed Current Testing

Figure 7A:
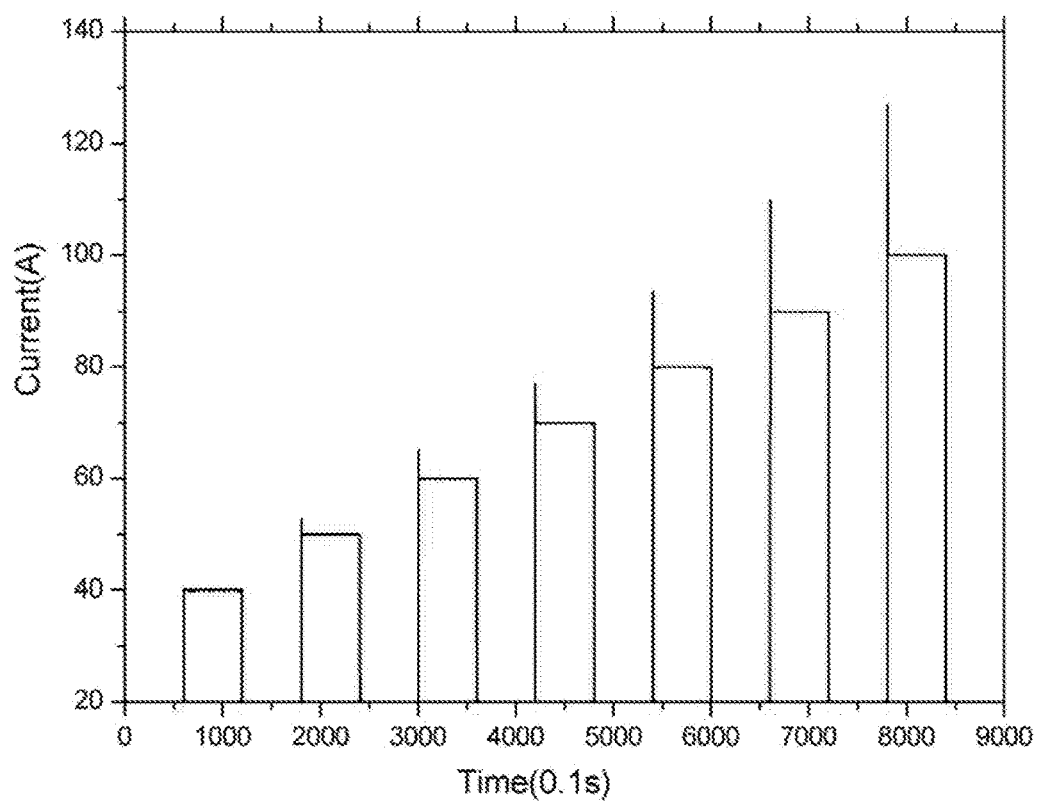
FIG. 7A charts current for both banks, with pulsing.
Figure 7B:
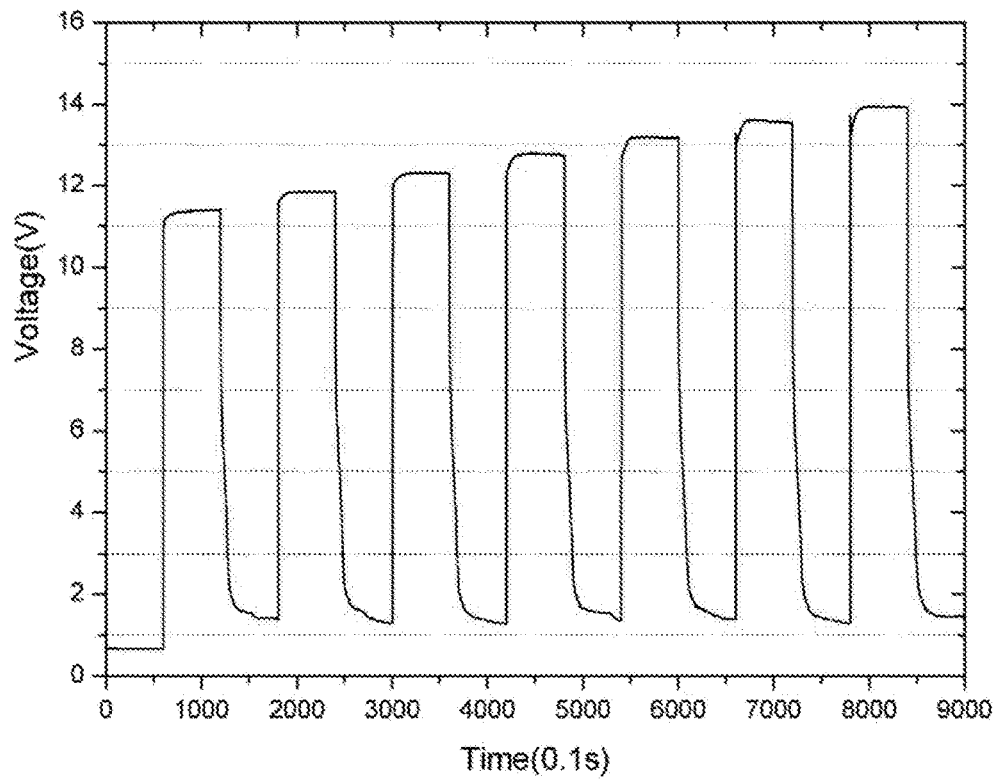
FIG. 7B charts voltage response with a pulsed current.
Figure 7C:
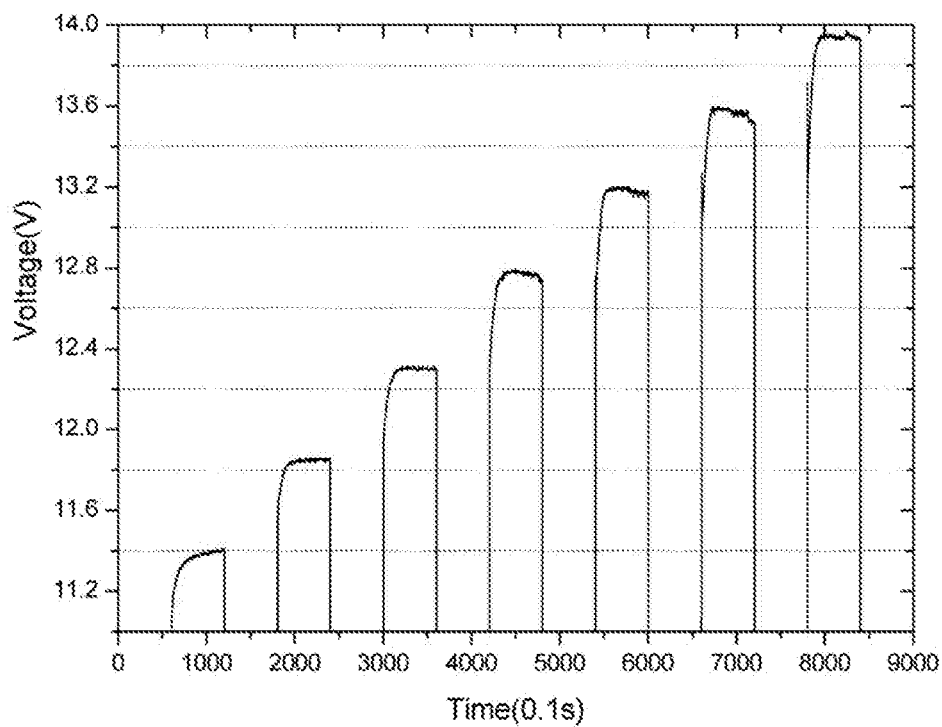
FIG. 7C is an enlarged view of voltage response from 11.2 to 14V.
Figure 7D:
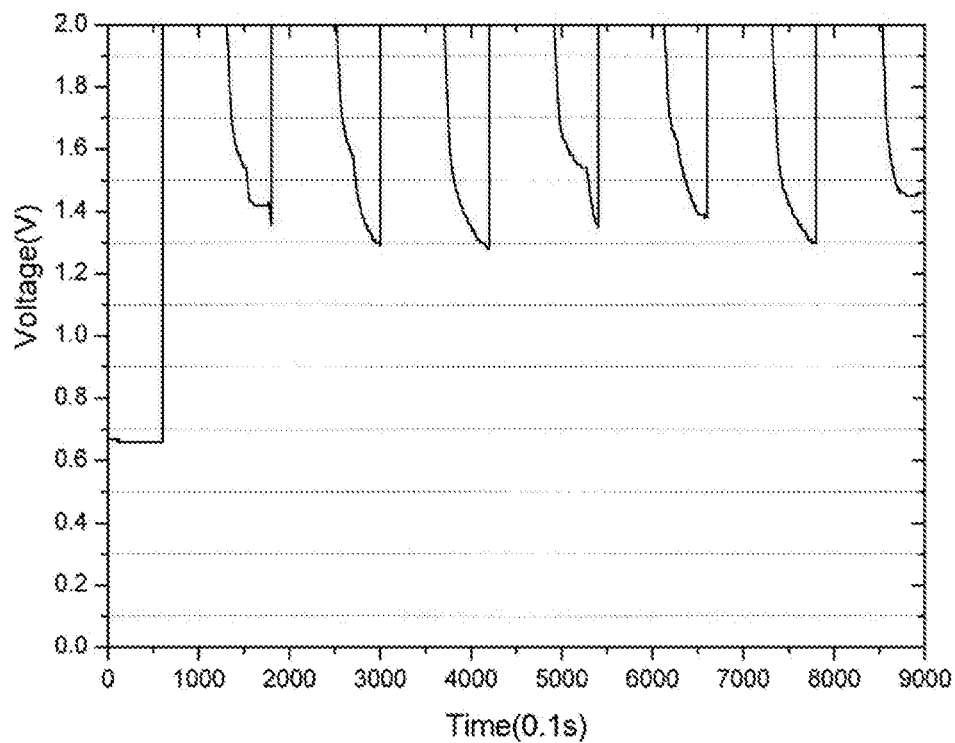
FIG. 7D is an enlarged view of voltage response from 0 to 2V.

Since response voltage at different currents may be dependent on temperature, the water electrolyzer was operated at 50 A for an extended period prior to beginning the pulse testing. The pulse test included a series of pulses: 0-40 A, 0-50 A, 0-60 A, 0-70 A, 0-80 A, 0-90 A, 0-100 A, 0 A. Each pulse lasted for 60 s. FIG. 7A shows the test current curve with both banks connected. The voltage response curve of the electrolyzer to the pulse currents is shown in FIG. 7B. Enlarged views of voltage from 11.2V to 14.0V, and from 0V to 2V (open circuit voltage at I=0) are shown in FIG. 7C and FIG. 7D, respectively. The data indicate that the tested electrolyzer has good dynamic performance that is predictable over a wide range of current up to 100 A. In fact, it will be shown later that the Brown's gas volume rate was nearly 6 L/min at 100 A current (FIG. 17) and the gas production rate increased linearly with the current during the whole pulse test sequence.

Comparison of Left and Right Bank Performance

Figure 8A:
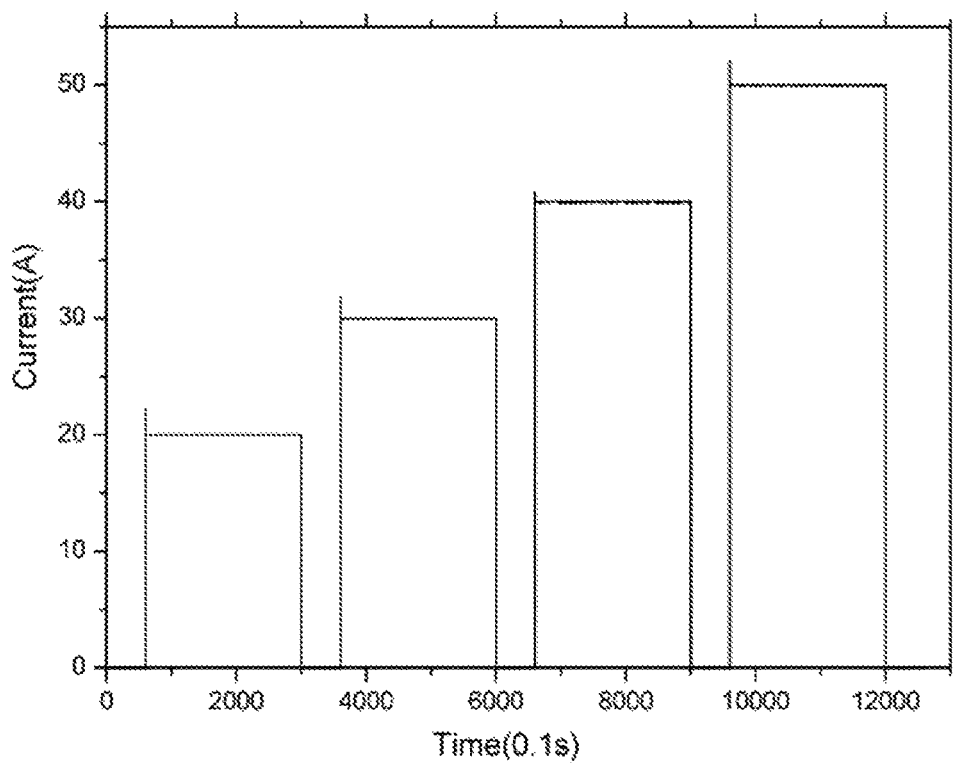
FIG. 8A charts pulsed current for each bank.
Figure 8B:
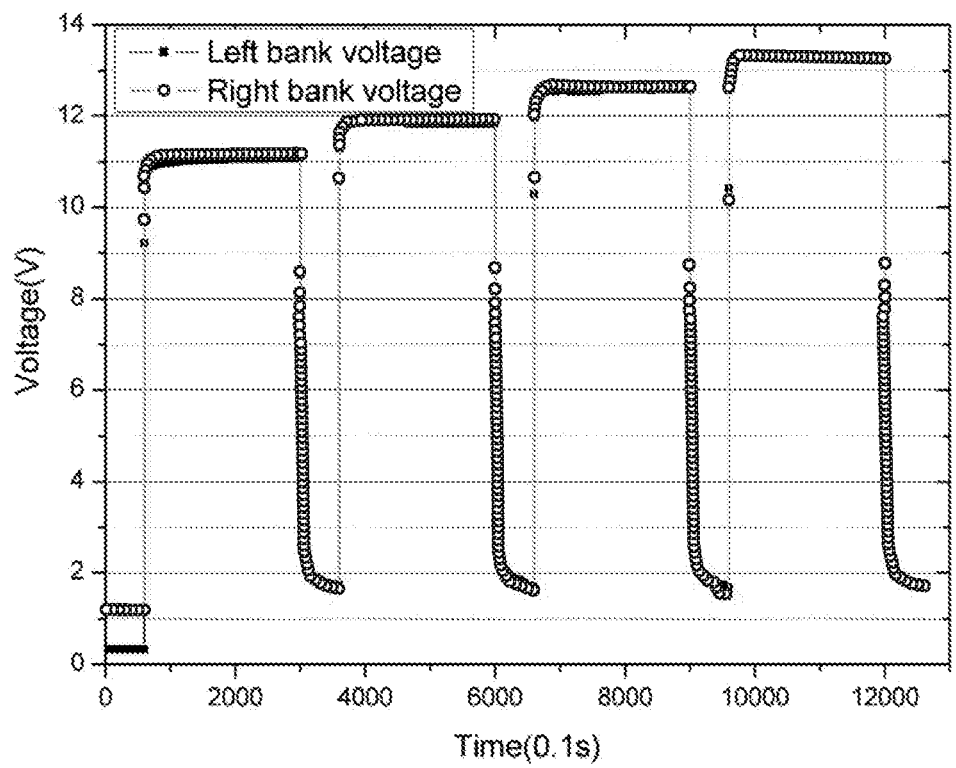
FIG. 8B charts voltage response with a modified (e.g., pulsed) current.
Figure 8C:
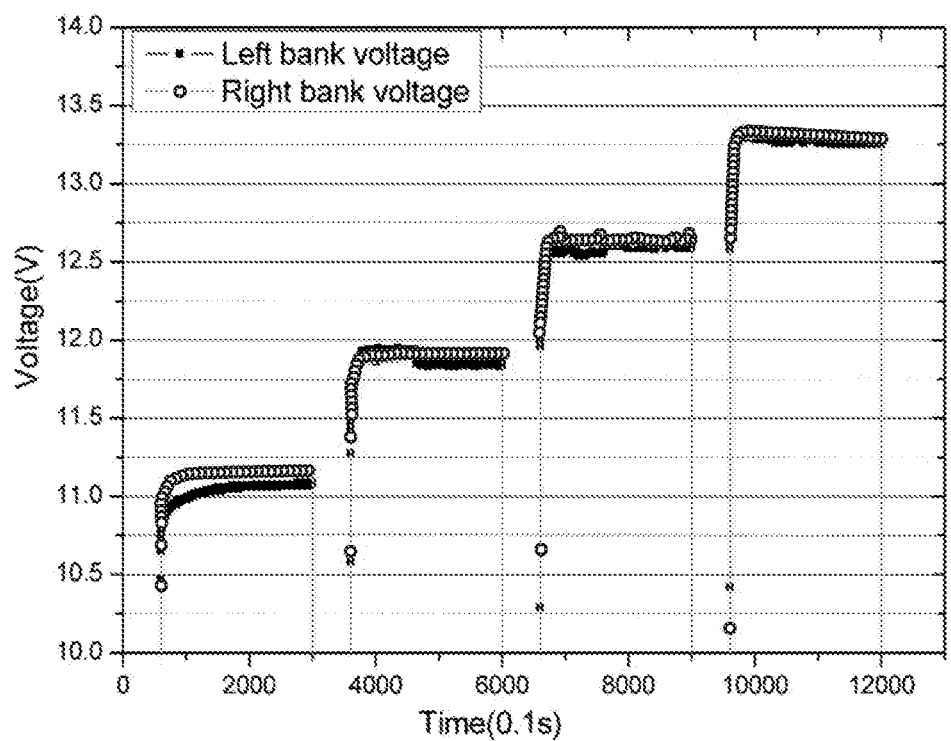
FIG. 8C is an enlarged view of voltage response from 10 to 14V.
Figure 8D:
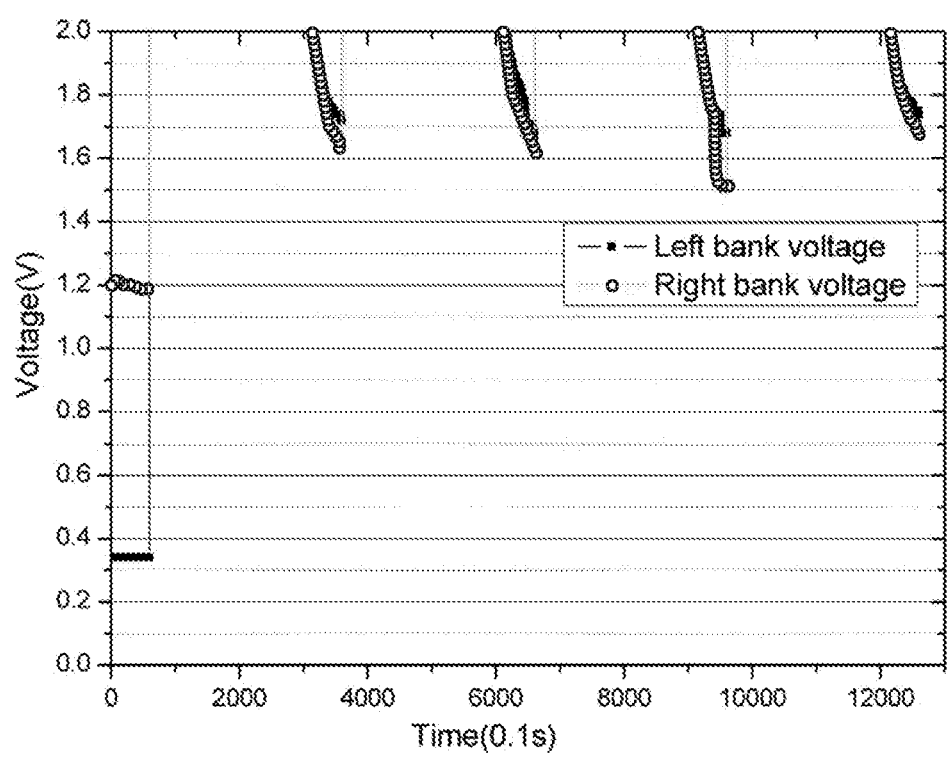
FIG. 8D is an enlarged view of voltage response from 0 to 2V.

The tested electrolyzer included both left bank and right banks. It was of interest to test each bank separately to determine their consistency. Each bank was tested at one-half the currents shown in FIG. 7A for both banks. However, in this test, the current pulses were for 240 seconds and the rest period between pulses was 60 seconds. FIG. 8A shows the current curve for each bank. The voltage response curve of the Left bank and Right bank with the pulse current is shown in Figure. 8B. The enlarged views of voltage response from 10V to 14V, and from 0V to 2V are shown in FIG. 8C and FIG. 8D, respectively. From FIG. 8C and FIG. 8D, the voltage difference between them is less than 0.15V (the error is 1.3%). Hence, the performance of the Left bank and the Right bank are highly consistent.

Characteristics of the Tested Electrolyzer

The pulse test results were used to determine the performance characteristics of the electrolyzer and whether the results are consistent with the relationships derived above using Faraday's law and the ideal gas equation.

Figure 9A:
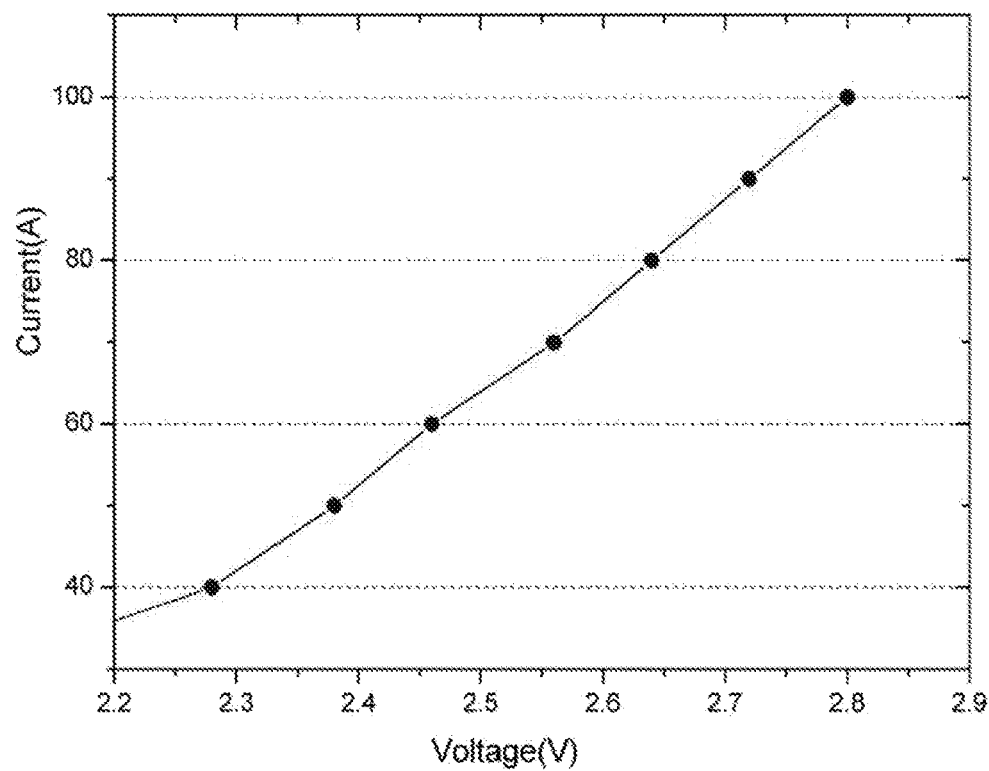
FIG. 9A charts average current versus voltage for the 2 banks run in parallel.

The pulse characteristics of the electrolyzer for a range of currents (cell currents between 20-50 A) have been shown in FIGS. 8A-8D. The cell voltages vary with current and in all cases the voltage rises rapidly when current is applied. For purposes of cell characterization, the nearly steady value achieved for each current step is of primary interest. Each bank includes five cells in series and the two banks were operated in parallel. Hence the average current through each cell is ½ and the average voltage is V/5. The average cell voltage as a function of cell current is shown in FIG. 9A. Note that the curve of Vcell vs Icell is nearly linear except between 20-30 A so it can be approximated as V=A+BI, where, as discussed in Eq. (9), A is related to the open-circuit voltage of the cell and B is related to its resistance. A curve fit of the portion of the curve from 30-50 A yields $$V\text{cell} = 1.95 + 0.017\, I\text{cell} \tag{11}$$

indicating a resistance of 0.017 Ohm per cell. FIG. 7C indicates a cell open circuit voltage of 1.3-1.4V which is significantly less than the 1.95V value in Eq. (11). This higher value is likely due to the over-potential at the stainless plate needed to generate the limiting exchange current [x].

Figure 9B:
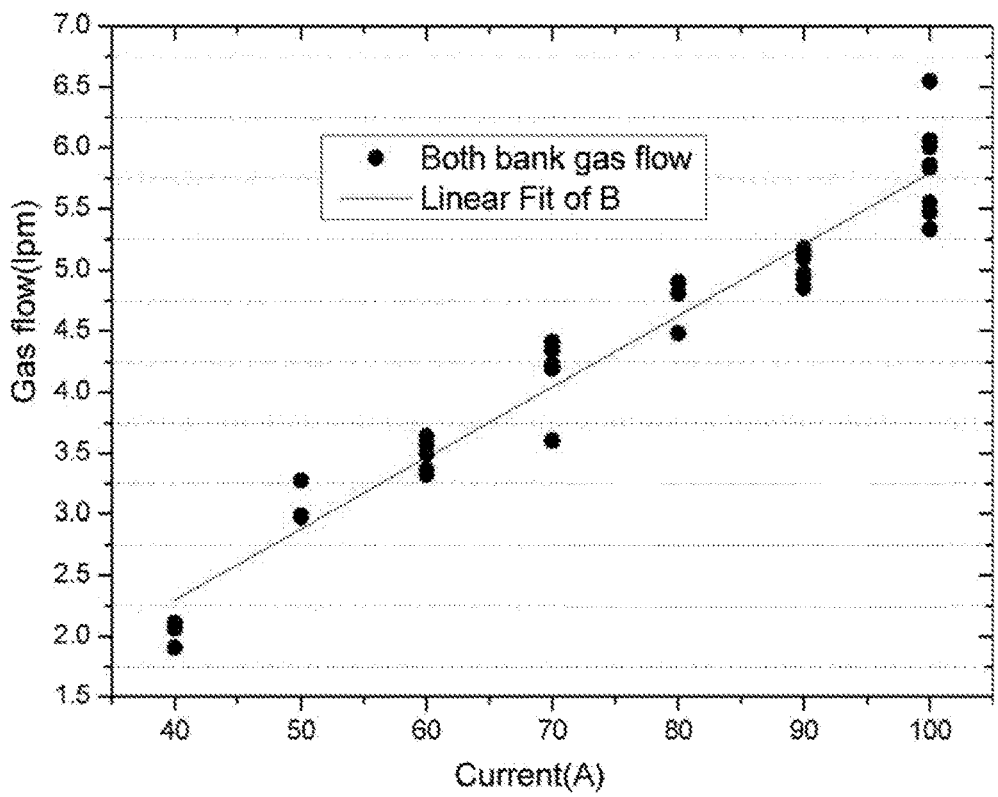
FIG. 9B charts Brown's gas production versus current.

The measured dependence of the Brown's gas production rate on total current to the electrolyzer is shown in FIG. 9B. There is considerable scatter in the Brown's gas data, but the curve of the average values is almost linear with current as predicted by Eq. (8). The predicted Brown's gas production rate (L/min) is the following.

$$V_{BG}\ (\text{L/min})/\text{electrolyzer} = 1.11 \times 10^{-1} I/\text{cell} = 0.056\, I_{total} \tag{12}$$

The characteristics of the tested electrolyzer are summarized in Table 2 below. The volume of the Brown's gas produced is certainly consistent with the claim of 3-4 L/min by Warner. Normalizing the volumetric rate by the total current (L/min per Amp) yielded an average value of 0.0573 L/min/A, which is in good agreement with the prediction.

TABLE 2

| Current (A) | Voltage (V) | BG Flow (L/min) | BG (L/min/A) | Measured Efficiency (Eq. 14) | Calculated Efficiency (Eq. 13) |
| --- | --- | --- | --- | --- | --- |
| 40 | 11.4 | 2.0 | 0.05 | 0.582 | 0.646 |
| 50 | 11.9 | 3.0 | 0.06 | 0.669 | 0.618 |
| 60 | 12.3 | 3.4 | 0.056 | 0.606 | 0.598 |
| 70 | 12.8 | 4.2 | 0.06 | 0.620 | 0.575 |
| 80 | 13.2 | 4.8 | 0.06 | 0.603 | 0.557 |
| 90 | 13.6 | 5.1 | 0.057 | 0.553 | 0.541 |
| 100 | 14.0 | 5.8 | 0.058 | 0.549 | 0.526 |

The energy efficiency of the electrolyzer can be calculated from equation 10

$$\eta = m_{H2}(\text{moles/sec}) \times (J/\text{mol})_{HHV}/VI \quad (10)$$

where $(J/\text{mol})_{HHV} = 284 \times 10^3$ J/mol$_{H2}$. Substituting using Eq. (5) for $m_{H2}$, the relationship for $\eta$ becomes $$\eta = 0.736 \, N_c/V \quad (13)$$

The equation for efficiency can also be written in terms of the Brown's gas production rate as $$\eta = 132.6 \times L_{BG}(L/\text{min})/VI \quad (14)$$

The efficiency of the electrolyzer was calculated using both Eq. 13 and 14 based on the measured BG rate and calculated H2. The results are shown in Table 2. Both approaches indicate that the electrolyzer efficiency is about 60% for the range of tested currents.

By way of example, the tested electrolyzer may exhibit about 0.5 Ohm resistance at about 14V, at 20-30 Amps.

It is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein, e.g., at least as described in the above paragraph.

The invention claimed is:

1. An electrolyzer device that converts liquid water into hydrogen and oxygen gas (Brown's gas) ("BG"), wherein the electrolyzer device comprises:
   a containment vessel configured to be filled with an aqueous solution including an electrolyte;
   a plurality of electrically conductive plates within the containment vessel, each plate being oriented vertically, wherein two or more of the plates are electrode plates, wherein the electrode plates extend outside of the containment vessel of the electrolyzer so that electrical connections to the electrode plates can be made outside of the containment vessel of the electrolyzer, no electrical connections being made on a sealed interior of the containment vessel;
   wherein each plate includes an insular wrap around vertical edges of each plate, as well as any top and bottom edges of each plate within the containment vessel so as to substantially deny applied current any stray path around the plates, wherein the insular wrap comprises grooves cut into the insular wrap into which the plates are received; and
   wherein that portion of each plate positioned in the containment vessel either:
      (i) does not include any holes formed therein; or
      (ii) does not include any holes formed in a bottom half thereof, any holes being positioned in a top half of each plate, holes of adjacent plates being offset relative to one another, so that the aqueous solution passes from a cavity between adjacent plates through the hole(s) in the top half of each plate.

2. The device of claim 1, wherein the plurality of plates further comprises one or more bi-polar plates which are of a shorter length than the electrode plates, such that the bi-polar plates are entirely disposed within the containment vessel.

3. The device of claim 1, wherein no internal gaskets are provided around edges of the plates.

4. The device of claim 1, wherein that portion of each plate positioned in the containment vessel does not include any holes formed therein.

5. The device of claim 1, wherein any holes are positioned in the top 30% of the plate height.

6. The device of claim 1, wherein any holes are positioned in the top 20% of the plate height.

7. The device of claim 1, wherein any holes are positioned in the top 10% of the plate height.

8. The device of claim 1, wherein the insular wrap includes one or more holes therein to allow flow of the aqueous solution into cells between plates, while allowing Brown's gas to exit the cells, such holes being placed and sized so that electrical resistance along a path through the aqueous solution including the electrolyte is greater from one plate to a next plate as compared to electrical resistance through the plates, thus allowing substantially no stray voltage, such that substantially all electricity applied to the device is used to produce Brown's gas.

9. The device of claim 1, wherein the plates are generally rectangular.

10. The device of claim 9, wherein the plates have a vertical height that is from about 2 to about 10 times a width of each plate, and the plates are oriented vertically, with any holes of each plate positioned towards the top of each plate, such that during use it is warmer aqueous solution that passes through the hole(s) of each plate, while cooler aqueous solution remains towards a bottom of each plate in the electrolyzer device.

11. The device of claim 1, wherein an outlet is provided at a top of the containment vessel of the electrolyzer for exiting warm aqueous solution and Brown's gas, and an inlet is provided at a bottom of the containment vessel of the electrolyzer device, such that during use warmer aqueous solution exits the electrolyzer device, for recirculation back into the electrolyzer device, through the inlet at or near the bottom of the electrolyzer device.

12. The device of claim 1, wherein any holes included in the plates are each smaller than 0.5 in$^2$.

13. An electrolyzer device that converts liquid water into hydrogen and oxygen gas (Brown's gas) ("BG"), wherein the electrolyzer device comprises:
   a containment vessel configured to be filled with an aqueous solution including an electrolyte;
   a plurality of electrically conductive plates within the containment vessel, each plate being oriented vertically, wherein two or more of the plates are electrode plates, wherein the electrode plates extend outside of the containment vessel of the electrolyzer so that electrical connections to the electrode plates can be made outside of the containment vessel of the electrolyzer, no electrical connections being made on a sealed interior of the containment vessel;
   wherein each plate includes an insular wrap around vertical edges of each plate, as well as any top and bottom edges of each plate within the containment vessel so as to substantially deny applied current any stray path around the plates, wherein the insular wrap comprises grooves cut into the insular wrap into which the plates are received; and
   wherein that portion of each plate positioned in the containment vessel does not include any holes formed therein, and a top portion of the insular wrap includes one or more holes formed therein for allowing passage of the aqueous solution including the electrolyte into the cells, wherein adjacent holes are offset relative to one another.

14. A method of generating Brown's gas for injection into an air intake apparatus of an internal combustion engine using an electrolyzer device mounted on a vehicle powered by the internal combustion engine, the electrolyzer device converting liquid water into Brown's gas, the method comprising:

providing the electrolyzer device, which comprises:

a containment vessel configured to be filled with a solution including an electrolyte;

a plurality of electrically conductive plates within the containment vessel, each plate being oriented vertically, wherein two or more of the plates are electrode plates, wherein the electrode plates extend outside of the containment vessel of the electrolyzer device so that electrical connections to the electrode plates can be made outside of the containment vessel of the electrolyzer, no electrical connections being made on a sealed interior of the containment vessel;

wherein each plate includes an insular wrap around vertical edges of each plate, as well as any top and bottom edges of each plate within the containment vessel so as to deny applied current any stray path around the plates, wherein the insular wrap comprises grooves cut into the insular wrap into which the plates are received;

wherein that portion of each plate positioned in the containment vessel either:

(i) does not include any holes formed therein; or (ii) does not include any holes formed in a bottom half thereof, any holes being positioned in a top half of each plate, holes of adjacent plates being offset relative to one another, so that the aqueous solution passes from a cavity between adjacent plates through the hole(s) in the top half of each plate; and operating the electrolyzer device to produce Brown's gas or hydrogen gas.

15. The method of claim 14, wherein the plurality of plates further comprise one or more bi-polar plates which are of a shorter length than the electrode plates, such that the bi-polar plates are entirely disposed within the containment vessel.

16. The method of claim 14, the method further comprising applying a magnetic field to the electrolyzer device during operation of the electrolyzer device.

17. The method of claim 14, the method further comprising applying resonance during operation of the electrolyzer device, by pulsing electric current applied to the electrode plates in a range of 1 to 500 Hz.

18. The method of claim 14, the method further comprising applying resonance during operation of the electrolyzer device, by pulsing electric current applied to the electrode plates in a range of 12 kHz to 20 kHz.

19. The method of claim 14, the method further comprising applying electromagnetic radiation within the sealed electrolyzer device, reducing covalent the covalent bonding energy across an O—H bond in a water molecule, aiding in electrolytic production of $O_2$ and $H_2$ during operation of the electrolyzer device.

* * * * *